United States Patent
Xie et al.

(10) Patent No.: US 11,876,680 B2
(45) Date of Patent: Jan. 16, 2024

(54) METHOD AND APPARATUS FOR DETERMINING LINK FOR FORWARDING SERVICE FLOW

(71) Applicant: Huawei Technologies Co., Ltd., Shenzhen (CN)

(72) Inventors: Jingrong Xie, Beijing (CN); Pingan Yang, Nanjing (CN); Yang Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/882,343

(22) Filed: Aug. 5, 2022

(65) Prior Publication Data

US 2022/0376983 A1 Nov. 24, 2022

Related U.S. Application Data

(63) Continuation of application No. PCT/CN2020/116010, filed on Sep. 17, 2020.

(30) Foreign Application Priority Data

Feb. 7, 2020 (CN) .......................... 202010082312.7
Apr. 30, 2020 (CN) .......................... 202010364422.2

(51) Int. Cl.
*H04L 41/0896* (2022.01)
*H04L 41/0894* (2022.01)

(52) U.S. Cl.
CPC ...... *H04L 41/0896* (2013.01); *H04L 41/0894* (2022.05)

(58) Field of Classification Search
CPC ..... H04L 45/38; H04L 45/24; H04L 41/0896; H04L 41/0897

(Continued)

(56) References Cited

U.S. PATENT DOCUMENTS 7,002,960 B1 * 2/2006 Golan ................... H04L 47/822
370/395.32
9,813,356 B1 * 11/2017 Kim ..................... H04L 49/1515
(Continued)

FOREIGN PATENT DOCUMENTS

| CN | 101510854 A | 8/2009 |
| CN | 101667963 A | 3/2010 |

(Continued)

OTHER PUBLICATIONS

"CloudEngine 12800 Series Switches, Eth-Trunk&M-LAG Technical White Paper," Document Version 01, Total 220 pages, Huawei Technologies Co., Ltd. (May 3, 2015). With an English machine translated by Google.

(Continued)

*Primary Examiner* — Hee Soo Kim
(74) *Attorney, Agent, or Firm* — Leydig, Voit & Mayer, Ltd.

(57) ABSTRACT

This application relates to the field of communication technologies, and discloses a method and an apparatus for determining a link for forwarding a service flow, and a storage medium. A first forwarding device obtains identification information of a first service flow; and determines, based on the identification information of the first service flow, a link bandwidth matrix, and link statuses respectively corresponding to N links, a first link for forwarding the first service flow. A hash operation does not need to be performed based on a device identifier of each forwarding device, and a specific forwarding device that performs forwarding does not need to be determined by comparing a plurality of hash values.

16 Claims, 4 Drawing Sheets

---

A first forwarding device obtains identification information of a first service flow — 601

The first forwarding device determines, based on a link bandwidth matrix, the identification information of the first service flow, and link statuses respectively corresponding to N links, a first link for forwarding the first service flow from the N links, where the link bandwidth matrix indicates link bandwidths respectively corresponding to the N links, and N is not less than 2 — 602

The first forwarding device forwards the first service flow through the first link — 603

(58) Field of Classification Search
USPC .......................................................... 709/224
See application file for complete search history.

(56) References Cited

U.S. PATENT DOCUMENTS

| | | | |
|---|---|---|---|
| 2005/0276263 A1 | 12/2005 | Suetsugu et al. | |
| 2007/0177594 A1* | 8/2007 | Kompella | H04L 45/24 370/432 |
| 2008/0165685 A1* | 7/2008 | Weiss | H04L 47/825 370/231 |
| 2010/0296430 A1* | 11/2010 | Breslau | H04L 12/1863 370/312 |
| 2014/0254374 A1* | 9/2014 | Janakiraman | H04L 47/10 370/235 |
| 2015/0372907 A1 | 12/2015 | Korhonen et al. | |
| 2017/0048144 A1* | 2/2017 | Liu | H04L 12/413 |
| 2023/0145097 A1* | 5/2023 | Kiran | H04L 47/2483 370/235 |

FOREIGN PATENT DOCUMENTS

| | | |
|---|---|---|
| CN | 101945432 A | 1/2011 |
| CN | 102271368 A | 12/2011 |
| CN | 103312613 A | 9/2013 |
| CN | 104301256 A | 1/2015 |
| CN | 102761479 B | 9/2015 |
| CN | 103236986 B | 6/2016 |
| CN | 106332141 A | 1/2017 |
| CN | 106559324 A | 4/2017 |
| CN | 106803812 A | 6/2017 |
| CN | 107579923 A | 1/2018 |
| CN | 109842556 A | 6/2019 |
| CN | 110113263 A | 8/2019 |
| CN | 110661703 A | 1/2020 |
| WO | 2011014303 A1 | 2/2011 |
| WO | 2021082812 A1 | 5/2021 |

OTHER PUBLICATIONS

J. Rabadan, Ed. et al., "Framework for EVPN Designated Forwarder Election Extensibility, draft-ietf-bess-evpn-df-election-framework-09," Total 29 pages (Jan. 24, 2019).
J. Rabadan, Ed. et al., "Preference-based EVPN DF Election, draft-ietf-bess-evpn-pref-df-05," Total 15 pages (Dec. 17, 2019).
N. Malhotra, Ed. et al., "Weighted Multi-Path Procedures for EVPN All-Active Multi-Homing, draft-ietf-bess-evpn-unequal-lb-02," Total 19 pages (Jul. 22, 2019).
S. Mohanty et al., "Weighted HRW and its applications, draft-mohanty-bess-weighted-hrw-01," Total 11 pages (Sep. 11, 2019).
D. Thaler et al., "Multipath Issues in Unicast and Multicast Next-Hop Selection," Request for Comments: 2991, Network Working Group, Total 9 pages (Nov. 2000).
C. Hopps "Analysis of an Equal-Cost Multi-Path Algorithm," Request for Comments: 2992, Network Working Group, Total 8 pages (Nov. 2000).
B. Fenner et al., "Protocol Independent Multicast-Sparse Mode (PIM-SM): Protocol Specification (Revised)," Request for Comments: 4601, Network Working Group, Total 112 pages (Aug. 2006).
J. Rabadan, Ed. et al., "Framework for Ethernet VPN Designated Forwarder Election Extensibility," Request for Comments: 8584, Internet Engineering Task Force (IETF), Total 32 pages (Apr. 2019).

* cited by examiner

METHOD AND APPARATUS FOR DETERMINING LINK FOR FORWARDING SERVICE FLOW

CROSS-REFERENCE TO RELATED APPLICATIONS

This application is a continuation of International Application No. PCT/CN2020/116010, filed on Sep. 17, 2020, which claims priorities to Chinese Patent Application No. 202010082312.7, filed on Feb. 7, 2020 and Chinese Patent Application No. 202010364422.2, filed on Apr. 30, 2020. All of the aforementioned patent applications are hereby incorporated by reference in their entireties.

TECHNICAL FIELD

This application relates to the field of communication technologies, and in particular, to a method and an apparatus for determining a link for forwarding a service flow.

BACKGROUND

Currently, in a multicast scenario, a receive end of multicast data may be connected to a plurality of forwarding devices. All the plurality of forwarding devices can receive multicast data sent by a multicast source. In this case, the plurality of forwarding devices each may determine, according to a hash algorithm, whether to forward the multicast data to the receive end. After any forwarding device in the plurality of forwarding devices receives the multicast data, the any forwarding device may perform a hash operation using a hash algorithm the same as that of other forwarding devices and based on an interface identifier of the any forwarding device and information about the multicast data, to obtain a first hash value. The any forwarding device may further perform a hash operation based on an interface identifier of another device and the information about the multicast data, to obtain a hash value corresponding to the another device. The any forwarding device determines a largest hash value from all the obtained hash values. If the forwarding device itself corresponds to the largest hash value, the forwarding device may serve as a selected forwarding device to forward the multicast data to the receive end; or if the forwarding device itself does not correspond to the largest hash value, the forwarding device does not forward the multicast data. A quantity of forwarding devices connected to the receive end determines a quantity of hash operations that need to be performed, and each of the forwarding devices connected to the receive end needs to compare hash values that are obtained through calculation. This results in large calculation and low efficiency.

SUMMARY

This application provides a method and an apparatus for determining a link for forwarding a service flow, to reduce a calculation amount and improve efficiency. Technical solutions are as follows:

According to a first aspect, this application provides a method for determining a link for forwarding a service flow and is applied to a first forwarding device. The method includes: obtaining identification information of a first service flow; and determining, based on a link bandwidth matrix, the identification information of the first service flow, and link statuses respectively corresponding to N links, a first link for forwarding the first service flow from the N links, where the link bandwidth matrix indicates link bandwidths of the N links, and N is not less than 2.

In embodiments of this application, the first forwarding device may obtain the identification information of the first service flow, and determine, based on the identification information of the first service flow, the link bandwidth matrix, and the link statuses respectively corresponding to the N links, the first link for forwarding the first service flow. It can be learned that in embodiments of this application, a hash operation does not need to be performed based on a device identifier of each forwarding device, and a specific forwarding device that performs forwarding does not need to be determined by comparing a plurality of hash values. Therefore, an amount of calculation is small and efficiency is high.

In an implementation, the method for determining a link for forwarding a service flow provided in embodiments of this application may further include: obtaining identification information of a second service flow; and determining, based on the identification information of the second service flow, the link bandwidth matrix, and the link statuses respectively corresponding to the N links, a second link for forwarding the second service flow from the N links. In embodiments of this application, for a received service flow, the first forwarding device may determine a link for forwarding the service flow by using the method provided in embodiments of this application. The first forwarding device may select a service flow-based link for forwarding, thereby implementing load balancing of a plurality of service flows.

In an implementation, an implementation process of the determining, based on a link bandwidth matrix, the identification information of the first service flow, and link statuses respectively corresponding to N links, a first link for forwarding the first service flow from the N links may include: performing a hash operation on the identification information of the first service flow, to obtain a first hash value; and determining the first link from the N links based on the link bandwidth matrix, the first hash value, and the link statuses respectively corresponding to the N links.

In a possible implementation, the link bandwidth matrix is an M×(N+3) matrix, M is not less than 1, an $i^{th}$ row in the M rows corresponds to an $i^{th}$ type of link bandwidth, a value range of i is 1 to M, kith column in the N columns corresponds to a $j^{th}$ link, a quantity x of first elements included in the $j^{th}$ column is used to indicate that the $j^{th}$ link uses an $x^{th}$ type of link bandwidth, a value range of x is from 1 to M, the $(N+3)^{th}$ column represents a bandwidth difference, the $(N+2)^{th}$ column represents an accumulated configured bandwidth, and the $(N+1)^{th}$ column represents an accumulated actual bandwidth. An element in an $(i+1)^{th}$ row of the $(N+3)^{th}$ column is a difference between a link bandwidth corresponding to the $(i+)^{th}$ row and a link bandwidth corresponding to an $i^{th}$ row, and an element in a $1^{st}$ row of the $(N+3)^{th}$ column is a value of a first type of link bandwidth. An element in an $(i+1)^{th}$ row of the $(N+2)^{th}$ column is a sum of an element in an $i^{th}$ row of the $(N+2)^{th}$ column and a product of the element in the $(i+1)^{th}$ row of the $(N+3)^{th}$ column and a quantity of first elements included in an $(i+1)^{th}$ row of the N columns, and an element in a $1^{st}$ row of the $(N+2)^{th}$ column is a quantity of first elements included in a $1^{st}$ row of the N columns. An element in an $(i+1)^{th}$ row of the $(N+1)^{th}$ column is a sum of an element in an $i^{th}$ row of the $(N+1)^{th}$ column and a product of the element in the $(i+1)^{th}$ row of the $(N+3)^{th}$ column and a quantity of first elements included in an $(i+1)^{th}$ row of N−Y columns in the N columns, where Y is a quantity of links whose link statuses are faulty, and a value range of Y is from 0 to N−1; and the element in the $1^{st}$ row of the $(N+3)^{th}$ column is a quantity of first elements included in a $1^{st}$ row of the N−Y columns in the N columns.

In an implementation, the $(N+1)^{th}$ column, the $(N+2)^{th}$ column, and the $(N+3)^{th}$ column of the link bandwidth matrix may also be separately stored as a vector.

When a link bandwidth matrix is the foregoing link bandwidth matrix, an implementation process of the determining the first link from the N links based on the link bandwidth matrix, the first hash value, and the link statuses respectively corresponding to the N links may include: determining a first value $k_1$ based on an element in an $M^{th}$ row of the $(N+2)^{th}$ column and the first hash value; determining, starting from an element in a $1^{st}$ row of the $(N+2)^{th}$ column, a row number Z of an element whose value is greater than $k_1$; determining a second value $k_2$ based on $k_1$, an element in a $(Z−1)^{th}$ row of the $(N+2)^{th}$ column, and an element in a $Z^{th}$ row of the $(N+3)^{th}$ column; and determining the first link based on an element in a $Z^{th}$ row of the N columns, $k_2$, and the link statuses respectively corresponding to the N links.

In an implementation, an implementation process of the determining the first link based on an element in a $Z^{th}$ row of the N columns, $k_2$, and the link statuses respectively corresponding to the N links may include: searching elements in the $Z^{th}$ row of the N columns for a column in which a $k_2^{th}$ first element is located; and if a link status corresponding to the column in which the $k_2^{th}$ first element is located is normal, determining a link corresponding to the column in which the $k_2^{th}$ first element is located as the first link.

In an implementation, if a link status corresponding to the found column in which a $k_2^{th}$ first element is located is faulty, the method may further include: determining a third value $k_3$ based on the first hash value and an element in a $P^{th}$ row of the $(N+1)^{th}$ column, where P is a quantity of types of link bandwidths corresponding to remaining N−Y links excluding the Y links whose link statuses are faulty; determining, starting from an element in a $1^{st}$ row of the $(N+1)^{th}$ column, a row number Z' of an element whose value is greater than $k_3$; determining a fourth value $k_4$ based on $k_3$, an element in a $(Z'-1)^{th}$ row of the $(N+1)^{th}$ column, and an element in a $Z'^{th}$ row of the $(N+3)^{th}$ column; and searching elements in a $Z'^{th}$ row of the N−Y columns for a column in which a $k_4^{th}$ first element is located, and determining a link corresponding to the column in which the $k_4^{th}$ first element is located as the first link.

In embodiments of this application, a link for forwarding a service flow can be determined by performing a hash operation on identification information of the service flow and by searching the link bandwidth matrix, without a need to perform a hash operation on identification information of each link or each forwarding device. This reduces calculation amount and improves load balancing efficiency. In embodiments of this application, when a determined link is faulty, another normal link may be determined, by performing a second operation, to bypass the faulty link to forward the service flow. This improves service forwarding stability and load balancing efficiency.

In another possible implementation, the link bandwidth matrix is an M×(N+2) matrix, M is not less than 1, an $i^{th}$ row in the M rows corresponds to an $i^{th}$ type of link bandwidth, a value range of i is 1 to M, a $j^{th}$ column in the N columns corresponds to a $j^{th}$ link, a quantity x of first elements included in the $j^{th}$ column is used to indicate that the $j^{th}$ link uses an $x^{th}$ type of link bandwidth, a value range of x is from 1 to M, the $(N+2)^{th}$ column represents a configured bandwidth, and the $(N+1)^{th}$ column represents an actual bandwidth. An element in an $i^{th}$ row of the $(N+2)^{th}$ column is a quantity of first elements included in an $i^{th}$ row of the N columns. An element in an $i^{th}$ row of the $(N+1)^{th}$ column is a quantity of first elements included in an $i^{th}$ row of N−Y columns in the N columns, where Y is a quantity of links whose link statuses are faulty, and a value range of Y is from 0 to N−1.

When a link bandwidth matrix is the second type of the link bandwidth matrix, an implementation process of the determining the first link from the N links based on the link bandwidth matrix, the first hash value, and the link statuses respectively corresponding to the N links may include: determining a fifth value $t_1$ based on M and the first hash value, where $t_1$ ranges from 1 to M; determining a sixth value $t_2$ based on a $t_1^{th}$ element from a $1^{st}$ row to an $M^{th}$ row of the $(N+2)^{th}$ column and the first hash value; and determining the first link based on $t_1$, $t_2$, the link bandwidth matrix, and the link statuses respectively corresponding to the N links.

In an implementation, an implementation process of the determining the first link based on $t_1$, $t_2$, the link bandwidth matrix, and the link statuses respectively corresponding to the N links may include: searching, according to a preset direction, a $t_1^{th}$ row of the N columns for a column in which a $t_2^{th}$ first element is located; and if a link status corresponding to the column in which the $t_2^{th}$ first element is located is normal, determining a link corresponding to the column in which the $t_2^{th}$ first element is located as the first link.

In an implementation, if a link status corresponding to the column in which the $t_2^{th}$ first element is located is faulty, the implementation process may further include: determining a seventh value $t_3$ based on the first hash value and P, where P is a quantity of types of link bandwidths corresponding to remaining N−Y links excluding the Y links whose link statuses are faulty; determining an eighth value $t_4$ based on a $t_3^{th}$ element from a $1^{st}$ row to a $M^{th}$ row of the $(N+1)^{th}$ column and the first hash value; searching a $t_3^{th}$ row of the N−Y columns for a column in which a $t_4^{th}$ first element is located; and determining a link corresponding to the column in which the $t_4^{th}$ first element is located as the first link.

In an implementation, for the foregoing two link bandwidth matrices, the link bandwidth matrix may further include an $(M+1)^{th}$ row, and an element in a $j^{th}$ column of the $(M+1)^{th}$ row is used to indicate a link status corresponding to a $j^{th}$ link. That is, the $(M+1)^{th}$ row of the link bandwidth matrix may be used to store a link status corresponding to each link.

In an implementation, the first service flow may be a multicast service flow. In this case, after determining, based on the link bandwidth matrix, the identification information of the first service flow, and the link statuses respectively corresponding to N links, the first link for forwarding the first service flow from the N links, the first forwarding device forwards the first service flow through the first link if the first link is a link corresponding to the first forwarding device, and skips forwarding the first service flow if the first link is not a link corresponding to the first forwarding device.

The method for determining a link for forwarding a service flow provided in embodiments of this application may be applied to a multicast scenario. In this scenario, the N links may be links on a plurality of forwarding devices, and the plurality of forwarding devices each may determine, according to the foregoing method, the first link for forwarding the first service flow. Therefore, after determining the first link, the first forwarding device may detect whether the first link is a link of the first forwarding device. If the first link is a link of the first forwarding device, the first forwarding device performs forwarding; or if the first link is not a link of the first forwarding device, the first forwarding device does not perform forwarding. In this way, load balancing of a plurality of service flows on a plurality of forwarding devices is implemented in a multicast scenario.

In an implementation, in a multicast scenario, before determining a link for forwarding a service flow, the first forwarding device may further obtain configuration information of both the first forwarding device and another forwarding device, where the configuration information includes information about a load balancing group to which the first forwarding device and the another forwarding device belong, and link bandwidths of N links included in the load balancing group. The first forwarding device generates the link bandwidth matrix based on the configuration information.

The configuration information of the another forwarding device is sent by the another forwarding device to the first forwarding device. Alternatively, the configuration information of the another forwarding device may be statically configured on the first forwarding device.

In an implementation, the first service flow in embodiments of this application may alternatively be a unicast service flow. In this case, after determining, based on the link bandwidth matrix, the identification information of the first service flow, and the link statuses respectively corresponding to N links, the first link for forwarding the first service flow from the N links, the first forwarding device may forward the first service flow through the first link.

The method for determining a link for forwarding a service flow provided in embodiments of this application may be further applied to a unicast service scenario. In this scenario, there may be N links on the first forwarding device. After receiving a service flow, the first forwarding device may determine, according to the method provided in embodiments of this application, a specific link in the N links to send the service flow. This implements load balancing of a plurality of service flows on a plurality of links of a single forwarding device.

In an implementation in the unicast service scenario, before determining a link for forwarding a service flow, the first forwarding device may further obtain link identifiers and link bandwidths of the N links, and generate the link bandwidth matrix based on the link identifiers and the link bandwidths of the N links. The link identifiers and the link bandwidths of the N links may be statically configured on the first forwarding device.

According to a second aspect, this application further provides an apparatus for determining a link for forwarding a service flow, where the apparatus for determining a link for forwarding a service flow has corresponding functions of implementing the method for determining a link for forwarding a service flow in the first aspect. The apparatus for determining a link for forwarding a service flow includes at least one module, and the at least one module is configured to implement the method for determining a link for forwarding a service flow provided in the first aspect.

According to a third aspect, this application further provides a network device. A structure of the network device includes a processor and a memory. The memory is configured to store a program that supports the network device in performing the method for determining a link for forwarding a service flow provided in the first aspect, and store data used to implement the method for determining a link for forwarding a service flow provided in the first aspect. The processor is configured to execute the program stored in the memory. An operation apparatus of the storage device may further include a communication bus, and the communication bus is configured to establish a connection between the processor and the memory.

According to a fourth aspect, a computer-readable storage medium is provided. The computer-readable storage medium stores instructions. When the instructions are run on a computer, the computer performs the method for determining a link for forwarding a service flow according to the first aspect.

According to a fifth aspect, a computer program product including instructions is provided. When the computer program product runs on a computer, the computer performs the method for determining a link for forwarding a service flow according to the first aspect.

Technical effects achieved in the second aspect, the third aspect, the fourth aspect, and the fifth aspect are similar to those achieved by corresponding technical means in the first aspect. Details are not described again herein.

Beneficial effects brought by the technical solutions provided in this application include at least the following: In embodiments of this application, a hash operation does not need to be performed based on a device identifier of each forwarding device, and a forwarding device that performs forwarding does not need to be determined by comparing a plurality of hash values. Therefore, an amount of calculation is small and efficiency is high.

DETAILED DESCRIPTION

To make objectives, technical solutions, and advantages of this application clearer, the following further describes implementations of this application in detail with reference to the accompanying drawings.

Figure 1:
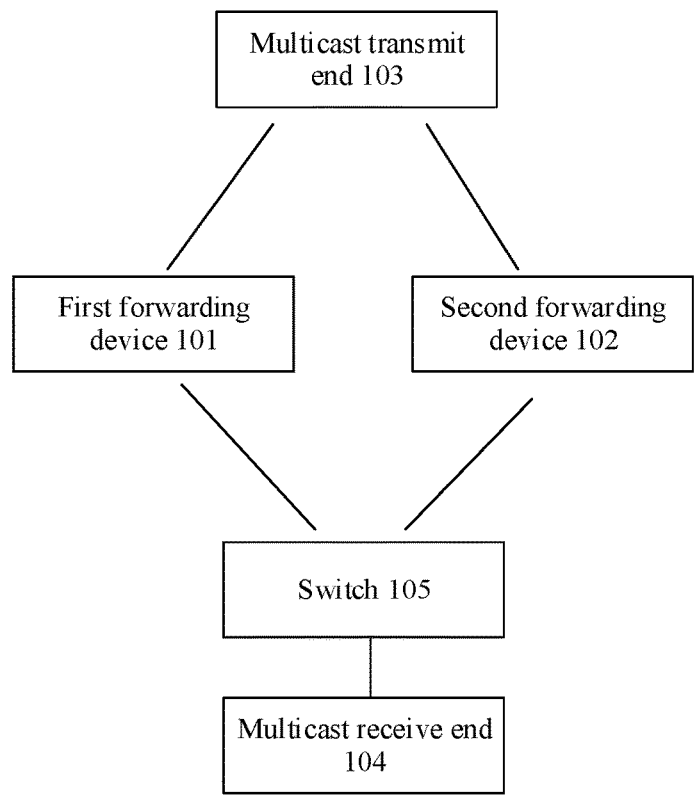
FIG. 1 is a diagram of an implementation environment in which a method for determining a link for forwarding a service flow is applied to a multicast service scenario according to an embodiment of this application.

FIG. 1 is a diagram of an implementation environment in which a method for determining a link for forwarding a service flow is applied to a multicast service scenario according to an embodiment of this application. As shown in FIG. 1, the implementation environment may include a first forwarding device 101, a second forwarding device 102, a multicast transmit end 103, and a multicast receive end 104. Both the first forwarding device 101 and the second forwarding device 102 establish a communication connection to the multicast receive end 104. In addition, both the first forwarding device 101 and the second forwarding device 102 may establish a communication connection to the multicast transmit end 103.

In a possible implementation, the first forwarding device 101 and the second forwarding device 102 may communicate with the multicast receive end 104 through a switch 105. After receiving a multicast service flow sent by the multicast transmit end 103, the first forwarding device 101 and the second forwarding device 102 may determine, according to the method for determining a link for forwarding a service flow provided in this embodiment of this application, a link for forwarding the multicast service flow. After determining that the link is a link corresponding to the first forwarding device 101 or the second forwarding device 102, the corresponding forwarding device forwards the multicast service flow through the link, and the other forwarding device does not forward the multicast service flow. In this way, load balancing for different multicast service flows is implemented. The first forwarding device 101 and the second forwarding device 102 separately communicate with the multicast receive end 104 through a layer 2 interface. Alternatively, the first forwarding device 101 and the second forwarding device 102 may separately communicate with the multicast receive end 104 through an Ethernet link aggregation (Eth-trunk) interface.

In addition, in this embodiment of this application, the first forwarding device 101 and the second forwarding device 102 may be connected to the multicast transmit end 103 by using the protocol independent multicast (PIM) protocol. Alternatively, the first forwarding device 101 and the second forwarding device 102 may be connected to the multicast transmit end 103 via an ethernet virtual private network (EVPN). Further, the first forwarding device 101 and the second forwarding device 102 may be connected to the multicast transmit end 103 by using a multicast virtual private network (MVPN).

The first forwarding device 101 and the second forwarding device 102 may be routers, or may be other network devices having a routing and forwarding function. This is not limited in this embodiment of this application. In addition, in FIG. 1, only two forwarding devices are used as an example to describe the implementation environment of this embodiment of this application. In actual application, there may be more than two forwarding devices, for example, there may be three, four, or more forwarding devices. In this case, each forwarding device may use the method provided in this embodiment of this application to determine a link corresponding to each received multicast service flow, and forward each corresponding multicast service flow, so as to implement load balancing for multicast service flows.

Figure 2:
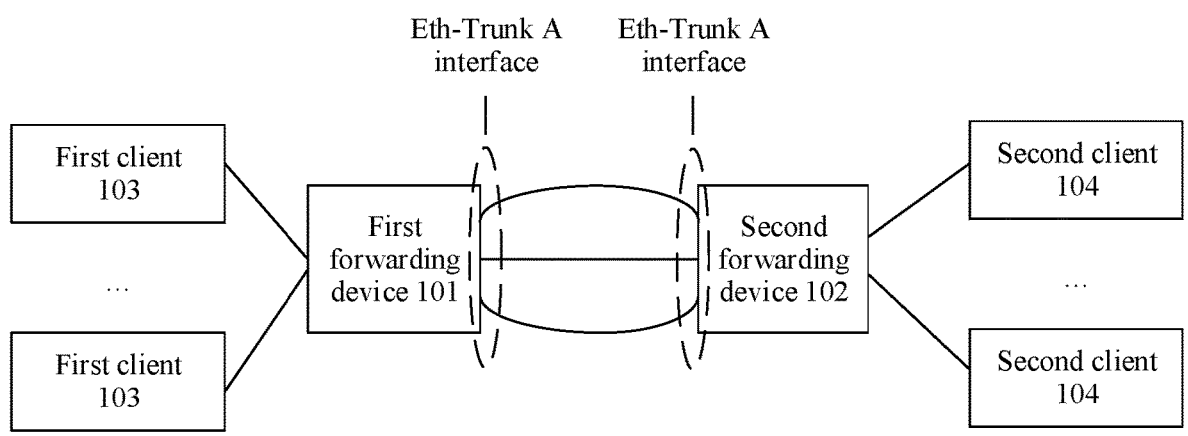
FIG. 2 is a diagram of an implementation environment in which a method for determining a link for forwarding a service flow is applied to a unicast service scenario according to an embodiment of this application.

FIG. 2 is a diagram of an implementation environment in which a method for determining a link for forwarding a service flow is applied to a unicast service scenario according to an embodiment of this application. As shown in FIG. 2, the implementation environment may include a first forwarding device 101, a second forwarding device 102, a plurality of first clients 103, and a plurality of second clients 104. The plurality of first clients 103 may all communicate with the first forwarding device 101, the first forwarding device 101 may communicate with the second forwarding device 102, and the second forwarding device 102 may communicate with the plurality of second clients 104.

As shown in FIG. 2, an Eth-Trunk A interface may be configured on both the first forwarding device 101 and the second forwarding device 102. The Eth-Trunk A interface may include a plurality of member interfaces, for example, may include three member interfaces: member interfaces 1 to 3. Member interfaces 1 to 3 on the first forwarding device 101 respectively correspond to member interfaces 1 to 3 on the second forwarding device 102, to form three links.

When any first client 103 sends a unicast service flow as a transmit end, the first forwarding device 101 may determine, according to the method provided in this embodiment of this application, a link for forwarding the unicast service flow, and then forward the unicast service flow through a corresponding member interface. Correspondingly, the second forwarding device 102 may receive the unicast service flow through a corresponding member interface, and forward the unicast service flow to a corresponding second client. When any second client 104 sends a unicast service flow as a transmit end, the second forwarding device 102 may forward the unicast service flow in the foregoing implementation of the first forwarding device 101. The first forwarding device 101 and the second forwarding device 102 may be network devices that have a data forwarding function, such as routers and switches.

Figure 3:
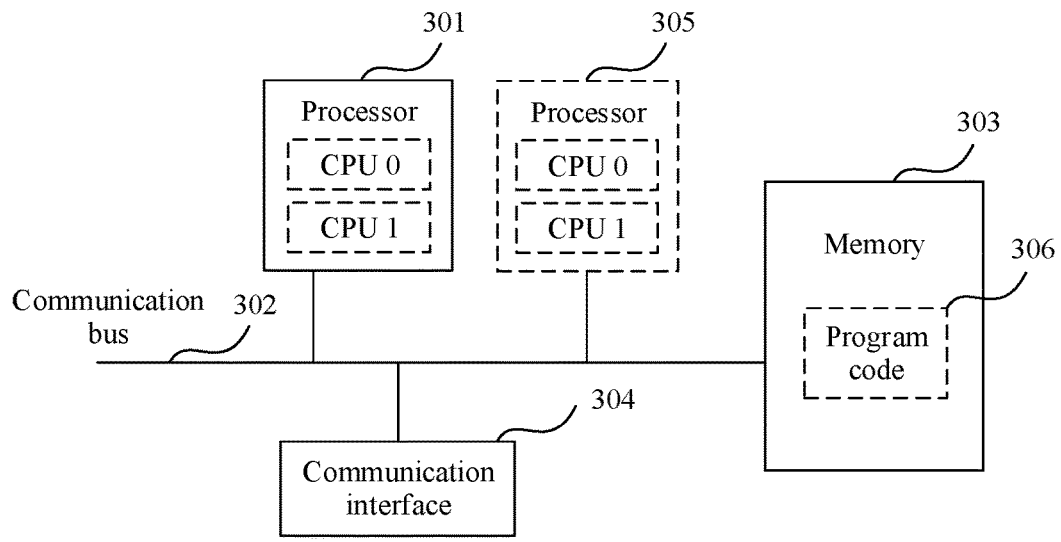
FIG. 3 is a schematic diagram of a structure of a network device according to an embodiment of this application.

FIG. 3 is a schematic diagram of a structure of a network device according to an embodiment of this application. The network device has functions implemented by the first forwarding device and the second forwarding device shown in FIG. 1 or FIG. 2. The functions may be implemented based on hardware, or may be implemented by executing corresponding software based on hardware. The hardware or the software includes one or more modules corresponding to the functions.

In FIG. 3, the network device includes at least one processor 301, a communication bus 302, a memory 303, and at least one communication interface 304.

The processor 301 may be a network processing unit (NPU) a general-purpose central processing unit (CPU), a microprocessor, an application-specific integrated circuit (ASIC), or one or more integrated circuits configured to control program execution of the solutions in this application.

The communication bus 302 may include a channel and transfers information between the foregoing components.

The memory 303 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory is not limited thereto. The memory 303 may exist independently, and is connected to the processor 301 through the communication bus 302. The memory 303 may alternatively be integrated with the processor 301.

The communication interface 304 is configured to communicate with another device or a communication network by using any transceiver-type apparatus, for example, an Ethernet, a radio access network (RAN), or a wireless local area network (WLAN).

During exemplary implementation, in an embodiment, the processor 301 may include one or more CPUs, for example, a CPU 0 and a CPU 1 shown in FIG. 3.

During exemplary implementation, in an embodiment, the network device may include a plurality of processors, for example, the processor 301 and a processor 305 shown in FIG. 3. Each of the processors may be a single-core (single-CPU) processor or a multi-core (multi-CPU) processor. Herein, the processor may be one or more devices, circuits, and/or processing cores configured to process data (for example, computer program instructions).

The memory 303 is configured to store program code used to execute the solution of this application, where the program code is executed under control of the processor 301. The processor 301 is configured to execute program code 306 stored in the memory 303. The program code 306 may include one or more software modules. The network device may implement a method in any possible implementation of the following methods by using the processor 301 and one or more software modules in the program code 306 in the memory 303.

Figure 4:
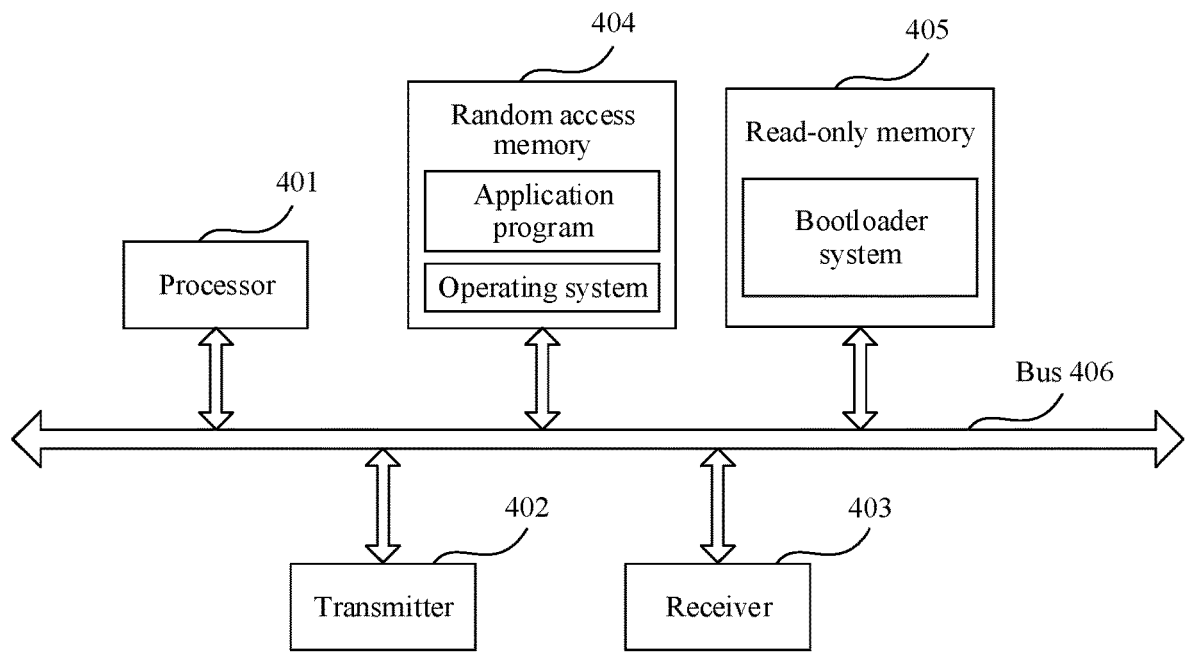
FIG. 4 is a schematic diagram of a structure of another network device according to an embodiment of this application.

According to FIG. 4, in another possible design, the network device may include a processor 401, a transmitter 402, a receiver 403, a random access memory 404, a read-only memory 405, and a bus 406. The processor 401 is coupled to the transmitter 402, the receiver 403, the random access memory 404, and the read-only memory 405 through the bus 406. When the network device needs to be run, the network device is started by using a basic input/output system built into the read-only memory or a bootloader system in an embedded system, to boot the network device to enter a normal running state. After the network device enters the normal running state, an application program and an operating system are run in the random access memory, to enable the processor to perform a method in any possible implementation of the following methods in the following embodiments.

Figure 5:
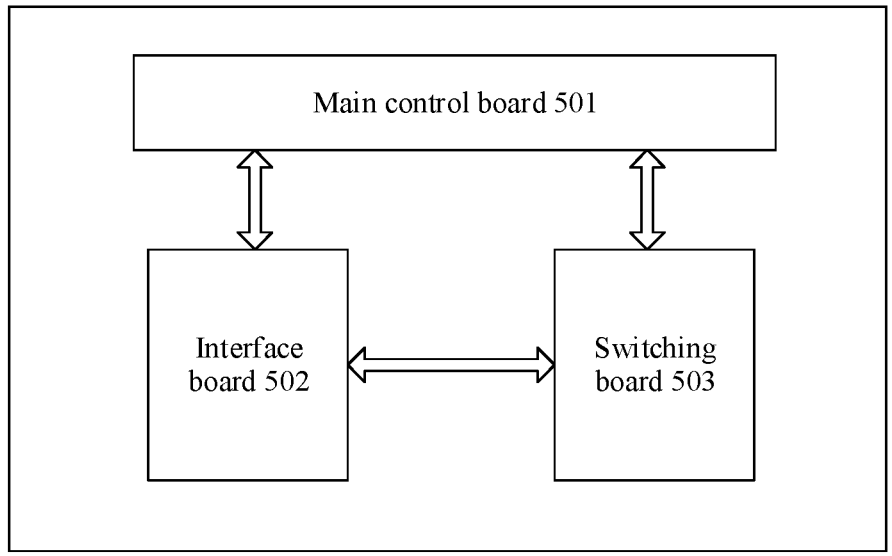
FIG. 5 is a schematic diagram of a structure of still another network device according to an embodiment of this application.

According to FIG. 5, in another possible design, the network device includes a main control board 501 and an interface board 502, and may further include a switching board 503. The network device is configured to perform a method in any possible implementation of the following methods. Specifically, the network device includes a module configured to perform a method in any possible implementation of the following methods.

In another possible design, the network device includes a controller and a first forwarding sub-device. The first forwarding sub-device includes an interface board, and may further include a switching board. The first forwarding sub-device is configured to perform a function of the interface board, and may further perform a function of the foregoing switching board. The controller includes a receiver, a processor, a transmitter, a random access memory, a read-only memory, and a bus. The processor is coupled to the receiver, the transmitter, the random access memory, and the read-only memory through the bus. When the controller needs to be run, the controller is started by using a basic input/output system built into the read-only memory or a bootloader system in an embedded system, to boot the controller to enter a normal running state. After the controller enters the normal running state, an application program and an operating system are run in the random access memory, to enable the processor to execute a function of the main control board in the foregoing aspect.

The following describes methods for determining a link for forwarding a service flow provided in embodiments of this application.

Figure 6:
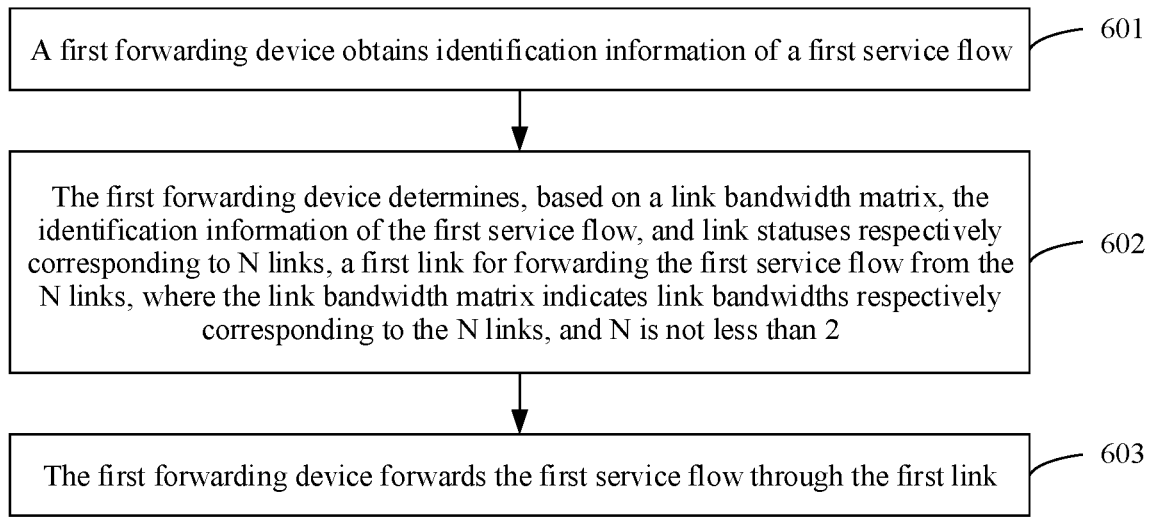
FIG. 6 is a flowchart of a method for determining a link for forwarding a service flow according to an embodiment of this application.
Figure 7:
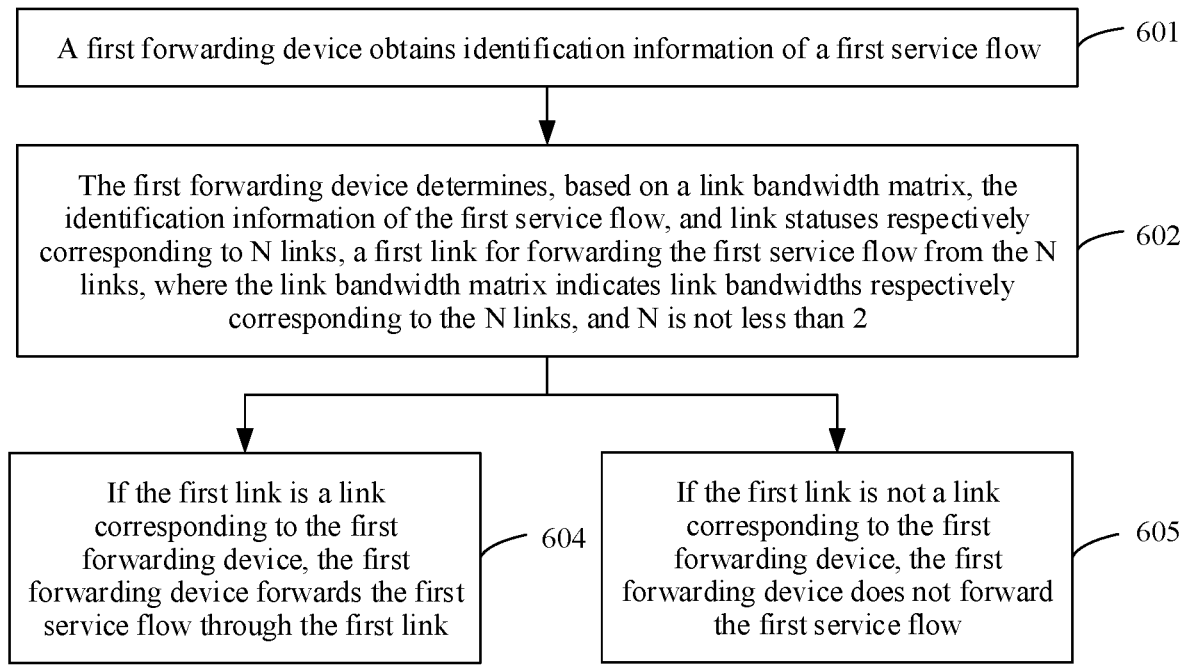
FIG. 7 is a flowchart of another method for determining a link for forwarding a service flow according to an embodiment of this application.

FIG. 6 and FIG. 7 are flowcharts of two methods for determining a link for forwarding a service flow according to embodiments of this application. FIG. 6 is used in a case in which one link is selected from a plurality of links on a single forwarding device to perform load balancing, for example, in an Eth-trunk scenario of a unicast service shown in FIG. 2. FIG. 7 is used in a case in which one link is selected from a plurality of links corresponding to a plurality of forwarding devices to perform load balancing, for example, in a multicast service scenario shown in FIG. 1. The methods may be applied to any forwarding device shown in FIG. 1 or FIG. 2. Embodiments use an example in which the methods are applied to a first forwarding device to describe an implementation process of the methods. According to FIG. 6 and FIG. 7, the methods include the following steps.

At step 601: the first forwarding device obtains identification information of a first service flow.

In this embodiment of this application, the first forwarding device may receive the first service flow, and obtain the identification information of the first service flow. According to different application scenarios, the first service flow may be a unicast service flow or a multicast service flow.

The identification information of the first service flow may be information that can uniquely identify the service flow. For example, the identification information of the first service flow may be 5-tuple information in an obtained packet of the first service flow or an IPv6 source address and a flow label of an IPv6 header in an obtained packet of the first service flow. Alternatively, the flow label of the IPv6 header in the obtained packet of the first service flow may be directly used as the identification information of the first service flow.

At step 602: the first forwarding device determines, based on a link bandwidth matrix, the identification information of the first service flow, and link statuses respectively corresponding to N links, a first link for forwarding the first service flow from the N links, where the link bandwidth matrix indicates link bandwidths corresponding to the N links, and N is not less than 2.

After obtaining the identification information of the first service flow, the first forwarding device may perform a hash operation on the identification information of the first service flow to obtain a first hash value, and then determine the first link from the N links based on the link bandwidth matrix, the first hash value, and the link statuses respectively corresponding to the N links.

The link bandwidth matrix may be implemented in different manners, and methods for determining the first link vary accordingly based on the link bandwidth matrix, the first hash value, and the link statuses respectively corresponding to the N links. The following describes in detail two possible implementations in this embodiment of this application.

Implementation 1

In this implementation, the link bandwidth matrix is an M×(N+3) matrix, where M is not less than 1. M may be equal to 1, or may be another value not less than 2. An $i^{th}$ row in M rows corresponds to an $i^{th}$ type of link bandwidth. A value of i is an integer greater than or equal to 1 and less than or equal to M, that is, a value range of i is an integer range determined by 1 to M. A $j^{th}$ column in N columns corresponds to kith link and a quantity x of first elements included in the $j^{th}$ column is used to indicate that the $j^{th}$ link uses an $x^{th}$ type of link bandwidth. A value range of x is from 1 to M. An $(N+3)^{th}$ column represents a bandwidth difference, an $(N+2)^{th}$ column represents an accumulated configured bandwidth, and an $(N+1)^{th}$ column represents an accumulated actual bandwidth.

An element in an $(i+1)^{th}$ row of the $(N+3)^{th}$ column is a difference between a link bandwidth corresponding to the $(i+1)^{th}$ row and a link bandwidth corresponding to an $i^{th}$ row. An element in a $1^{st}$ row of the $(N+3)^{th}$ column is a value of a first type of link bandwidth.

An element in an $(i+1)^{th}$ row of the $(N+2)^{th}$ column is a sum of an element in an $i^{th}$ row of the $(N+2)^{th}$ column and a product of the element in the $(i+1)^{th}$ row of the $(N+3)^{th}$ column and a quantity of first elements included in an $(i+1)^{th}$ row of the N columns. An element in a $1^{st}$ row of the $(N+2)^{th}$ column is a quantity of first elements included in a $1^{st}$ row of the N columns.

An element in an $(i+1)^{th}$ row of the $(N+1)^{th}$ column is a sum of an element in an $i^{th}$ row of the $(N+1)^{th}$ column and a product of the element in the $(i+1)^{th}$ row of the $(N+3)^{th}$ column and a quantity of first elements included in an $(i+1)^{th}$ row of N−Y columns in the N columns, where Y is a quantity of links whose link statuses are faulty, and a value range of Y is from 0 to N−1. The element in the $1^{st}$ row of the $(N+3)^{th}$ column is a quantity of first elements included in a $1^{st}$ row of N−Y columns in the N columns.

As shown in the following matrix in Table 1, it is assumed that N is 16, that is, there are 16 links, and M is equal to 7, that is, there are 7 types of link bandwidths. In this case, the link bandwidth matrix is a 7×(16+3) matrix.

TABLE 1

Schematic diagram of the link bandwidth matrix

| Num0 | Num1 | Num2 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|
| \\ | 7 | 5 | 1 | 1 | 1 | 1 | 1 | 1 | 1 | 1 | 1 | 1 | 0 | 0 | 1 | 1 | 1 | LsBs |
| 60 | 267 | \\ | 0 | 0 | 0 | 0 | 0 | 0 | 0 | 0 | 0 | 0 | 0 | 1 | 1 | 0 | 0 | 0 | BwBs6(bw = 100) |
| 20 | 147 | \\ | 0 | 0 | 0 | 0 | 0 | 0 | 0 | 0 | 0 | 0 | 0 | 1 | 1 | 0 | 0 | 0 | BwBs5(bw = 40) |
| 10 | 107 | 67 | 1 | 0 | 0 | 0 | 0 | 0 | 0 | 0 | 0 | 0 | 0 | 1 | 1 | 0 | 0 | 0 | BwBs4(bw = 20) |
| 6 | 77 | 57 | 1 | 1 | 0 | 0 | 0 | 0 | 0 | 0 | 0 | 0 | 0 | 1 | 1 | 1 | 0 | 0 | BwBs3(bw = 10) |
| 2 | 47 | 39 | 1 | 1 | 1 | 1 | 1 | 1 | 0 | 0 | 0 | 0 | 0 | 1 | 1 | 1 | 1 | 0 | BwBs2(bw = 4) |
| 1 | 27 | 23 | 1 | 1 | 1 | 1 | 1 | 1 | 0 | 0 | 0 | 0 | 0 | 1 | 1 | 1 | 1 | 1 | BwBs1(bw = 2) |
| 1 | 16 | 14 | 1 | 1 | 1 | 1 | 1 | 1 | 1 | 1 | 1 | 1 | 1 | 1 | 1 | 1 | 1 | 1 | BwBs0(bw = 1) |

An $i^{th}$ row in seven rows included in the matrix corresponds to an $i^{th}$ type of link bandwidth. A value of i is an integer greater than or equal to 1 and less than or equal to 7, that is, a value range of i is an integer range determined by 1 to 7. When i=1, a $1^{st}$ row corresponds to a first type of link bandwidth. When i=2, a $2^{nd}$ row corresponds to a second type of link bandwidth, and so on. In the example of Table 1, BwBs(i−1) is used to represent an $i^{th}$ type of link bandwidth. To be specific, in Table 1, a bandwidth represented by BwBs0 is a first type of link bandwidth, a bandwidth represented by BwBs1 is a second type of link bandwidth, and by analogy, a bandwidth represented by BwBs6 is a seventh type of link bandwidth. In the foregoing example, the first type of link bandwidth is 1, the second type of link bandwidth is 2, a third type of link bandwidth is 4, a fourth type of link bandwidth is 10, a fifth type of link bandwidth is 20, a sixth type of link bandwidth is 40, and the seventh type of link bandwidth is 100.

A $j^{th}$ column in 16 columns included in the matrix corresponds to a $i^{th}$ link. A value of j is an integer greater than or equal to 1 and less than or equal to 16, that is, a value range of j is an integer range determined by 1 to 16. When j=1, elements in a $1^{st}$ column correspond to a $1^{st}$ link. When j=2, elements in a $2^{nd}$ column correspond to a $2^{nd}$ link, and so on. In the example of Table 1, a column identified by j−1 corresponds to a $j^{th}$ link. For example, a column identified by 0 in Table 1 corresponds to a $1^{st}$ link, a column identified by 1 in Table 1 corresponds to a $2^{nd}$ link, and by analogy, a column identified by 15 in Table 1 corresponds to a $16^{th}$ link.

In addition, a quantity x of first elements included in the $j^{th}$ column of the 16 columns is used to indicate that the $j^{th}$ link uses an $x^{th}$ type of link bandwidth. A value of x is an integer greater than or equal to 1 and less than or equal to 7, that is, a value range of x is an integer range determined by 1 to 7. The first elements may include 1. Correspondingly, a remaining element in the $j^{th}$ column may include an element different from the first element, for example, may include 0. Certainly, the first elements may alternatively include another value, provided that the value is different from that of another element. This is not limited in this embodiment of this application.

In Table 1, a first element 1 is used as an example. In elements in the $1^{st}$ column corresponding to the $1^{st}$ link identified by 0, two first elements are included from a $1^{st}$ row to a $7^{th}$ row. Therefore, it can be learned that the $1^{st}$ link uses the second type of link bandwidth. In elements in the $2^{nd}$ column corresponding to the $2^{nd}$ link identified by 1, three first elements are included from the $1^{st}$ row to the $7^{th}$ row. Therefore, the $2^{nd}$ link uses the third type of link bandwidth. Similarly, it can be learned that a $3^{rd}$ link uses the fourth type of link bandwidth, a $4^{th}$ link and a $5^{th}$ link both use the seventh type of link bandwidth, and a $6^{th}$ link to a $10^{th}$ link use the first type of link bandwidth. An $11^{th}$ link to a $14^{th}$ link use the third type of link bandwidth. A $15^{th}$ link uses the fourth type of link bandwidth. And a $16^{th}$ link uses the fifth type of link bandwidth.

As shown in Table 1, the $(N+3)^{th}$ column, that is, a $19^{th}$ column, is a column indicating a bandwidth difference and is represented by Num0. An element in a $1^{st}$ row of the $19^{th}$ column is a value of the first type of link bandwidth, and an element in an $(i+1)^{th}$ row of the $19^{th}$ column is a difference between a link bandwidth corresponding to the $(i+1)^{th}$ row and a link bandwidth corresponding to an $i^{th}$ row. As shown in Table 1, an element in a $2^{nd}$ row of the $19^{th}$ column is a difference between a link bandwidth corresponding to the $2^{nd}$ row and a link bandwidth corresponding to the $1^{st}$ row, that is, 2−1=1. An element in a $3^{rd}$ row of the $19^{th}$ column is a difference between a link bandwidth corresponding to the $3^{rd}$ row and a link bandwidth corresponding to the $2^{nd}$ row, that is, 4−2=2. An element in a $4^{th}$ row of the $19^{th}$ column is a difference between a link bandwidth corresponding to the $4^{th}$ row and a link bandwidth corresponding to the $3^{rd}$ row, that is, 10−4=6. By analogy, it can be learned that an element in a $5^{th}$ row of the $19^{th}$ column is 20−10=10, an element in a $6^{th}$ row is 40−20=20, and an element in a $7^{th}$ row is 100−40=60.

As shown in Table 1, the $(N+2)^{th}$ column, that is, an $18^{th}$ column, represents the accumulated configured bandwidth and is represented by Num1. An element in a $1^{st}$ row of the $18^{th}$ column is a quantity of first elements included in the $1^{st}$ row of the 16 columns corresponding to the 16 links. In the example of Table 1, the first element is 1. As shown in Table 1, the quantity of is included in the $1^{st}$ row of the 16 columns is 16. Therefore, it can be learned that the element in the $1^{st}$ row of the $18^{th}$ column is 16. An element in an $(i+1)^{th}$ row of the $18^{th}$ column is a sum of a product of an element in an $(i+1)^{th}$ row of an $(N+3)^{th}$ column and a quantity of first elements included in an $(i+1)^{th}$ row of the N columns and an element in an $i^{th}$ row of the $(N+2)^{th}$ column. As shown in Table 1, a quantity of first elements included in a $2^{nd}$ row of the 16 columns corresponding to the 16 links is 11, an element in the $2^{nd}$ row of the $19^{th}$ column is 1, and the element in the $1^{st}$ row of the $18^{th}$ column is 16. Therefore, an element in a $2^{nd}$ row of the $18^{th}$ column is: 1×11+16=27. Similarly, an element in a $3^{rd}$ row of the $18^{th}$ column is a sum of a product of an element in a $3^{rd}$ row of the $19^{th}$ column and a quantity of first elements included in a $3^{rd}$ row of the 16 columns and the element in the $2^{nd}$ row of the $18^{th}$ column, that is, 2×10+27=47. By analogy, an element in a $4^{th}$ row of the $18^{th}$ column is 6×5+47=77, an element in a $5^{th}$ row is 10×3+77=107, an element in a $6^{th}$ row is 20×2+107=147, and an element in a $7^{th}$ row is 60×2+147=267.

As shown in Table 1, the $(N+1)^{th}$ column, that is, a $17^{th}$ column, represents the accumulated actual bandwidth and is represented by Num2. An element in a $1^{st}$ row of the $17^{th}$ column is a quantity of first elements included in a $1^{st}$ row of 16-Y columns of the 16 columns. Y is a quantity of links whose link statuses are faulty.

In this embodiment of this application, a link status may be represented by an element included in an $(M+1)^{th}$ row of the link bandwidth matrix. To be specific, the link bandwidth matrix may further include the $(M+1)^{th}$ row, and an element in a $i^{th}$ column of the $(M+1)^{th}$ row may be used to indicate a link status corresponding to a $j^{th}$ link. As shown in Table 1, an element in a $1^{st}$ column of an $8^{th}$ row of the link bandwidth matrix is used to indicate a link status of the $1^{st}$ link, an element in a $2^{nd}$ column of the $8^{th}$ row is used to indicate a link status of the $2^{nd}$ link, and so on. An element 1 indicates that a link status of a corresponding link is normal, and an element 0 indicates that a link status of a corresponding link is faulty. An element used to indicate a link status may alternatively be another value. This is not limited herein.

In the example of Table 1, it can be seen from elements in the $8^{th}$ row of the link bandwidth matrix that, elements in a $4^{th}$ column and a $5^{th}$ column of the $8^{th}$ row are 0. Therefore, it can be known that link statuses of the $4^{th}$ link and the $5^{th}$ link are faulty. That is, two of the 16 links are faulty. Correspondingly, excluding the two columns corresponding to the two faulty links from the 16 columns corresponding to the 16 links, a quantity of first elements included in a $1^{st}$ row of remaining 14 columns is 14. Therefore, an element in the $1^{st}$ row of the $17^{th}$ column is 14.

An element in an $(i+1)^{th}$ row of the $17^{th}$ column is a sum of a product of the element in the $(i+1)^{th}$ row of the $(N+3)^{th}$ column and a quantity of first elements included in an $(i+1)^{th}$ row of N−Y columns of the N columns and an element in an $i^{th}$ row of the $(N+1)^{th}$ column. As shown in Table 1, an element in the $2^{nd}$ row of the $19^{th}$ column is 1, excluding the two columns corresponding to faulty links from the 16 columns corresponding to the 16 links, a quantity of first elements included in a $2^{nd}$ row of the remaining 14 columns is 9, and the element in the $1^{st}$ row of the $17^{th}$ column is 14. Therefore, an element in a $2^{nd}$ row of the $17^{th}$ column is 1×9+14=23. Similarly, an element in a $3^{rd}$ row of the $17^{th}$ column is a sum of the element in the $2^{nd}$ row of the $17^{th}$ column and a product of an element in the $3^{rd}$ row of the $19^{th}$ column and a quantity of first elements included in a $3^{rd}$ row of the remaining 14 columns excluding the two columns corresponding to faulty links. That is, the value is 2×8+23=39. By analogy, an element in a $4^{th}$ row of the $17^{th}$ column is 6×3+39=57, an element in a $5^{th}$ row is 10×1+57=67, an element in a $6^{th}$ row is 20×0+67=67, and an element in a $7^{th}$ row is 60×0+67=67.

In the foregoing example, there are seven types of configured bandwidths in total. An element in the $8^{th}$ row of the $18^{th}$ column may be used to indicate that there are seven types of configured bandwidths, that is, the element in the $8^{th}$ row of the $18^{th}$ column may be 7. There are six types of link bandwidth corresponding to the 16 links: 1, 2, 4, 10, 20, and 100. After the link bandwidth bw=100 corresponding to the two faulty links in the 16 links is removed, there are five link bandwidth types corresponding to the remaining 14 links, which are 1, 2, 4, 10, and 20. An element in the $8^{th}$ row of the $17^{th}$ column may be used to represent a quantity of link bandwidth types corresponding to links in a normal status. Correspondingly, in this embodiment of this application, elements in a $1^{st}$ row to a $5^{th}$ row of the $17^{th}$ column may be calculated, and elements in remaining two rows may not be calculated.

In some possible implementations, a link status of each link may also be separately stored as a link status vector. In this case, the link bandwidth matrix may not include the $(M+1)^{th}$ row. Use Table 1 as an example. The link bandwidth matrix may not include the $8^{th}$ row, and the $8^{th}$ row may be separately stored as a link status vector. In this way, when using a link status, the first forwarding device may determine a link status of each link directly by using the link status vector.

In some other possible implementations, the $(N+1)^{th}$ column, the $(N+2)^{th}$ column, and the $(N+3)^{th}$ column in the link bandwidth matrix each may be stored in a form of a vector. This is not limited in this embodiment of this application.

When a link bandwidth matrix is the link bandwidth matrix in the Implementation 1, a process in which the first forwarding device determines the first link for forwarding the first service flow may include: determining a first value $k_1$ based on an element in an $M^{th}$ row of the $(N+2)^{th}$ column and the first hash value; determining, starting from an element in a $1^{st}$ row of the $(N+2)^{th}$ column, a row number Z of an element whose value is greater than $k_1$; determining a second value $k_2$ based on $k_1$, an element in a $(Z-1)^{th}$ row of the $(N+2)^{th}$ column, and an element in a $Z^{th}$ row of the $(N+3)^{th}$ column; and determining the first link based on an element in a $Z^{th}$ row of the N columns, $k_2$, and the link statuses respectively corresponding to the N links.

For example, the first forwarding device may obtain the first hash value by performing a hashing operation on the identification information of the first service flow. The first forwarding device may perform a modulo operation on the first hash value and the element in the $M^{th}$ row of the $(N+2)^{th}$ column, and add 1 to a value obtained through the modulo operation to obtain $k_1$. Then, the first forwarding device may determine, starting from the element in the $1^{st}$ row of the $(N+2)^{th}$ column, the row number Z of the element whose value is greater than $k_1$. After determining Z, the first forwarding device may calculate a difference between $k_1$ and the element in the $(Z-1)^{th}$ row of the $(N+2)^{th}$ column, calculate a ratio of the difference to the element in the $Z^{th}$ row of the $(N+3)^{th}$ column, and round the ratio to obtain the second value $k_2$. If $Z=1$, it is directly determined that $k_2=Z=1$.

Table 1 is used as an example. The element in the $M^{th}$ row of the $(N+2)^{th}$ column is an element 267 in the $7^{th}$ row of the $18^{th}$ column. It is assumed that the first forwarding device performs a modulo operation on the first hash value and 267 and obtains $k_1=100$. The first forwarding device may search, starting from an element in the $1^{st}$ row of the $18^{th}$ column, for a row in which an element whose value is greater than 100 is located. It can be learned from Table 1 that a value of an element in the $5^{th}$ row is greater than 100, and therefore $Z=5$. The first forwarding device may calculate a difference between $k_1$ and an element in the $4^{th}$ row of the $18^{th}$ column, where the difference is $100-77=23$. Then, the first forwarding device may calculate a ratio of the difference 23 to the element 10 in the $5^{th}$ row of the $19^{th}$ column, and round the ratio to obtain the second value $k_2$ which is 2.

After determining the second value $k_2$, the first forwarding device may search elements in the $Z^{th}$ row of the N columns for a column in which a $k_2^{th}$ first element is located. If a link status corresponding to the column is normal, the first forwarding device may determine a link corresponding to the column as the first link.

If a link status corresponding to the found column in which the $k_2^{th}$ first element in the elements in the $Z^{th}$ row is located is faulty, the first forwarding device may determine a third value $k_3$ based on the first hash value and an element in a $P^{th}$ row of the $(N+1)^{th}$ column, where P is a quantity of types of link bandwidths corresponding to remaining N−Y links excluding the Y links whose link statuses are faulty. Then, the first forwarding device determines, starting from an element in a $1^{st}$ row of the $(N+1)^{th}$ column, a row number $Z'$ of an element whose value is greater than $k_3$; determines a fourth value $k_4$ based on $k_3$, an element in a $(Z'-1)^{th}$ row of the $(N+1)^{th}$ column, and an element in a $Z'^{th}$ row of the $(N+3)^{th}$ column; searches elements in a $Z'^{th}$ row of the N−Y columns for a column in which a $k_4^{th}$ first element is located; and determines a link corresponding to the column in which the $k_4^{th}$ first element is located as the first link.

The first forwarding device may perform a modulo operation on the first hash value and an element in a $P^{th}$ row of the $(N+1)^{th}$ column to obtain $k_3$. Then, the first forwarding device may determine, starting from the element in the $1^{st}$ row of the $(N+1)^{th}$ column, the row number $Z'$ of the element whose value is greater than $k_3$. After determining $Z'$, the first forwarding device may calculate a difference between $k_3$ and the element in the $(Z'-1)^{th}$ row of the $(N+1)^{th}$ column, calculate a ratio of the difference to the element in the $Z'^{th}$ row of the $(N+3)^{th}$ column, and round the ratio to obtain $k_4$. Then, the first forwarding device searches for the column of the $k_4^{th}$ first element from elements in a $Z'^{th}$ row of the N−Y columns corresponding to the remaining N−Y links excluding the Y faulty links, and determines the link corresponding to the column in which the $k_4^{th}$ first element is located as the first link.

The foregoing Table 1, and $Z=5$ and $k_2=2$ are used as an example. The first forwarding device may search for a column in which a $2^{nd}$ first element is located from elements in a $5^{th}$ row of the 16 columns corresponding to the 16 links. During searching for the column in which the $2^{nd}$ first element is located from elements in the $5^{th}$ row, the first forwarding device may search, in an order from a $1^{st}$ column to a $16^{th}$ column or in an order from a $16^{th}$ column to a $1^{st}$ column. In this case, the found column in which the $2^{nd}$ first element is located is a $5^{th}$ column. Then, the first forwarding device may determine a link status corresponding to a $5^{th}$ link. Because an element in the $8^{th}$ row of the $5^{th}$ column is 0, a link status of the $5^{th}$ link is faulty. Therefore, the $5^{th}$ link cannot be used as the first link for forwarding the first service flow. In this case, the first forwarding device may perform a modulo operation on the first hash value and an element in the $P^{th}$ row of the $17^{th}$ column. In this example, excluding the two faulty links, there are five types of link bandwidths corresponding to the remaining 14 links. Therefore, $P=5$, and the element in the $P^{th}$ row of the $17^{th}$ column is 67. The first forwarding device may perform a modulo operation on the first hash value and 67 to obtain $k_3$. It is assumed that $k_{3=32}$. The first forwarding device may determine, starting from an element in the $1^{st}$ row of the $17^{th}$ column, a row number of an element whose value is greater than 32. It can be learned from Table 1 that a value of an element in the $3^{rd}$ row is greater than 32, and therefore $Z'=3$. Then, the first forwarding device calculates a difference between $k_3$ and an element in the $2^{nd}$ row of the $17^{th}$ column, and the difference is $32-23=9$. The first forwarding device calculates a ratio of 9 and the element 2 in the $3^{rd}$ row of the $19^{th}$ column, and rounds the ratio. Therefore, $k_{4=4}$. Then, the first forwarding device searches for a column in which a $4^{th}$ first element is located from elements in a $3^{rd}$ row in the 14 columns corresponding to the remaining 14 links excluding the two faulty links. Searching may be performed in an order from the $1^{st}$ column to the $16^{th}$ column. In this case, a found column is a $12^{th}$ column. Because a link status corresponding to the $12^{th}$ column is normal, a $12^{th}$ link may be used as the first link for forwarding the first service flow. Certainly, searching may alternatively be performed in an order from the $16^{th}$ column to the $1^{st}$ column. In this case, a found column is a $13^{th}$ column. Because a link status corresponding to the $13^{th}$ column is normal, a $13^{th}$ link may be used as the first link for forwarding the first service flow.

Implementation 2

In this implementation, the link bandwidth matrix is an M×(N+2) matrix, where M is an integer greater than or equal to 1. M may be equal to 1, or may include another value greater than or equal to 2. An $i^{th}$ row in M rows corresponds to an $i^{th}$ type of link bandwidth. A value of i is an integer greater than or equal to 1 and less than or equal to M, that is, a value range of i is an integer range determined by 1 to M. A $j^{th}$ column in N columns corresponds to a $i^{th}$ link and a quantity x of first elements included in the $j^{th}$ column is used to indicate that the $j^{th}$ link uses an $x^{th}$ type of link bandwidth. A value range of x is from 1 to M. An $(N+2)^{th}$ column represents a configured bandwidth, and an $(N+1)^{th}$ column represents an actual bandwidth.

An element in an $i^{th}$ row of the $(N+2)^{th}$ column is a quantity of first elements included in an $i^{th}$ row of the N columns.

An element in an $i^{th}$ row of the $(N+1)^{th}$ column is a quantity of first elements included in an $i^{th}$ row of N−Y columns in the N columns, where Y is a quantity of links whose link statuses are faulty, and a value range of Y is from 0 to N−1.

As shown in Table 2, it is assumed that N is 16, that is, there are 16 links, and M is equal to 7, that is, there are 7 types of link bandwidths. In this case, the link bandwidth matrix is a 7×(16+2) matrix.

TABLE 2

Schematic diagram of the link bandwidth matrix

| Num1 | Num2 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|
| 7 | 5 | 1 | 1 | 1 | 1 | 1 | 1 | 1 | 1 | 1 | 1 | 1 | 0 | 0 | 1 | 1 | 1 | LsBs7 |
| 2 | 0 | 0 | 0 | 0 | 0 | 0 | 0 | 0 | 0 | 0 | 0 | 0 | 1 | 1 | 0 | 0 | 0 | BwBs6 |
| 2 | 0 | 0 | 0 | 0 | 0 | 0 | 0 | 0 | 0 | 0 | 0 | 0 | 1 | 1 | 0 | 0 | 0 | BwBs5 |
| 3 | 1 | 1 | 0 | 0 | 0 | 0 | 0 | 0 | 0 | 0 | 0 | 0 | 1 | 1 | 0 | 0 | 0 | BwBs4 |
| 5 | 3 | 1 | 1 | 0 | 0 | 0 | 0 | 0 | 0 | 0 | 0 | 0 | 1 | 1 | 0 | 0 | 0 | BwBs3 |
| 10 | 8 | 1 | 1 | 1 | 1 | 1 | 1 | 0 | 0 | 0 | 0 | 1 | 1 | 1 | 1 | 1 | 0 | BwBs2 |
| 11 | 9 | 1 | 1 | 1 | 1 | 1 | 1 | 0 | 0 | 0 | 0 | 1 | 1 | 1 | 1 | 1 | 1 | BwBs1 |
| 16 | 14 | 1 | 1 | 1 | 1 | 1 | 1 | 1 | 1 | 1 | 1 | 1 | 1 | 1 | 1 | 1 | 1 | BwBs0 |

An $i^{th}$ row in seven rows of the matrix corresponds to an $i^{th}$ type of link bandwidth, and a value of i is an integer greater than or equal to 1 and less than or equal to 7, that is, a value range of i is an integer range determined by 1 to 7. When i=1, a $1^{st}$ row corresponds to a first type of link bandwidth. When i=2, a $2^{nd}$ row corresponds to a second type of link bandwidth, and so on. In the example of Table 2, BwBs(i−1) is used to represent an $i^{th}$ type of link bandwidth. To be specific, in Table 2, a bandwidth represented by BwBs0 is a first type of link bandwidth, a bandwidth represented by BwBs1 is a second type of link bandwidth, and by analogy, a bandwidth represented by BwBs6 is a seventh type of link bandwidth.

A $j^{th}$ column in 16 columns included in the matrix corresponds to a $j^{th}$ link. A value of j is an integer greater than or equal to 1 and less than or equal to 16, that is, a value range of j is an integer range determined by 1 to 16. When j=1, elements in a $1^{st}$ column correspond to a $1^{st}$ link. When j=2, elements in a $2^{nd}$ column correspond to a $2^{nd}$ link, and so on. In the example of Table 2, a column identified by j−1 corresponds to a $j^{th}$ link. For example, a column identified by 0 in Table 2 corresponds to a $1^{st}$ link, a column identified by 1 in Table 2 corresponds to a $2^{nd}$ link, and by analogy, a column identified by 15 in Table 2 corresponds to a $16^{th}$ link.

In an implementation, the matrix may further include an $(M+1)^{th}$ row, and an element in a $j^{th}$ column of the $(M+1)^{th}$ row is used to indicate a link status of the $j^{th}$ link. When the element in the $j^{th}$ column of the $(M+1)^{th}$ row is a first indication element, the link status of the $j^{th}$ link is normal; or when the element in the $j^{th}$ column of the $(M+1)^{th}$ row is a second indication element, the link status of the $j^{th}$ link is faulty. In the example of Table 2, the $(M+1)^{th}$ row is an $8^{th}$ row, the first indication element is 1, and the second indication element is 0. Alternatively, the first indication element may be 0, and the second indication element may be 1.

In an implementation, the link bandwidth matrix may alternatively not include the $(M+1)^{th}$ row. Instead, the $(M+1)^{th}$ row may be directly used as a link status vector for separate storage. For example, in the example of Table 2, elements in the $8^{th}$ row may be stored as a link status vector. When using a link status, the first forwarding device may determine a link status of each link by using the link status vector.

A quantity x of first elements included in the $j^{th}$ column of the 16 columns is used to indicate that the $j^{th}$ link uses an $x^{th}$ type of link bandwidth. A value of x is an integer greater than or equal to 1 and less than or equal to 7, that is, a value range of x is an integer range determined by 1 to 7. The first elements may include 1. Correspondingly, a remaining element in the $j^{th}$ column may include an element different from the first element, for example, may include 0. Certainly, the first elements may alternatively include another value, provided that the value is different from that of another element. This is not limited in this embodiment of this application.

In Table 2, a first element 1 is used as an example. In elements in the $1^{st}$ column corresponding to the $1^{st}$ link identified by 0, two first elements are included from a $1^{st}$ row to a $7^{th}$ row. Therefore, it can be learned that the $1^{st}$ link uses the second type of link bandwidth. In elements in the $2^{nd}$ column corresponding to the $2^{nd}$ link identified by 1, three first elements are included from the $1^{st}$ row to the $7^{th}$ row. Therefore, the $2^{nd}$ link uses a third type of link bandwidth. Similarly, it can be learned that a $3^{rd}$ link uses a fourth type of link bandwidth, a $4^{th}$ link and a $5^{th}$ link both use a seventh type of link bandwidth, and a $6^{th}$ link to a $10^{th}$ link use the first type of link bandwidth. An $11^{th}$ link to a $14^{th}$ link use the third type of link bandwidth. A $15^{th}$ link uses the fourth type of link bandwidth, and a $16^{th}$ link uses a fifth type of link bandwidth.

The $(N+2)^{th}$ column, that is, an $18^{th}$ column, in the link bandwidth matrix is a column indicating a configured bandwidth and is represented by Num1. An element in an $i^{th}$ row of the $18^{th}$ column is a quantity of first elements included in an $i^{th}$ row of the 16 columns corresponding to the 16 links. For example, an element in a $1^{st}$ row of the $18^{th}$ column is a quantity of first elements included in the $1^{st}$ row of the 16 columns corresponding to the 16 links. As shown in Table 2, 16 first elements are included in the $1^{st}$ row of the 16 columns corresponding to the 16 links. Therefore, the element in the $1^{st}$ row of the $18^{th}$ column is 16. Similarly, an element in a $2^{nd}$ row of the $18^{th}$ column is a quantity of first elements included in the $2^{nd}$ row of the 16 columns corresponding to the 16 links, and as shown in Table 2, the quantity is 11. By analogy, an element in a $3^{rd}$ row of the $18^{th}$ column is 10, an element in a $4^{th}$ row of the $18^{th}$ column is 5, an element in a $5^{th}$ row of the $18^{th}$ column is 3, and elements in a $6^{th}$ row and a $7^{th}$ row of the $18^{th}$ column are both 2.

The $(N+1)^{th}$ column, that is, a $17^{th}$ column, in the link bandwidth matrix is a column indicating an actual bandwidth and is represented by Num2. An element in an $i^{th}$ row of the $17^{th}$ column is a quantity of first elements included in an $i^{th}$ row of the N−Y columns corresponding to remaining N−Y normal links excluding Y faulty links from the 16 links. In Table 2, the $4^{th}$ link and the $5^{th}$ link in the 16 links are faulty links. Therefore, the element in the $i^{th}$ row of the $17^{th}$ column is a quantity of first elements included in the $i^{th}$ row of 14 columns corresponding to remaining 14 normal links excluding the two faulty links from the 16 links. For example, an element in a $1^{st}$ row of the $17^{th}$ column is a quantity of first elements included in a $1^{st}$ row of the 14 columns corresponding to the 14 normal links, and therefore, the quality is 14. An element in a $2^{nd}$ row of the $17^{th}$ column is a quantity of first elements included in the $2^{nd}$ row of the 14 columns corresponding to the 14 normal links, and therefore, the quality is 9. Similarly, it can be learned that an element in a $3^{rd}$ row of the $17^{th}$ column is 8, an element in a $4^{th}$ row is 3, an element in a $5^{th}$ row is 1, and elements in a $6^{th}$ row and a $7^{th}$ row are both 0.

In addition, when the link bandwidth matrix includes the $(M+1)^{th}$ row, an element in an $(N+2)^{th}$ column of the $(M+1)^{th}$ row may be used to indicate a quantity of types of configured link bandwidths. In the example of Table 2, the quantity of types of configured link bandwidths is 7. Therefore, an element in the $18^{th}$ column of an $8^{th}$ row is 7. An element in an $(N+1)^{th}$ column of the $(M+1)^{th}$ row may be used to indicate a quantity of types of link bandwidths corresponding to remaining N−Y links excluding the Y faulty links in the N links. In the example of Table 2, the $4^{th}$ link and the $5^{th}$ link in the 16 links are faulty links, and the quantity of types of link bandwidths corresponding to the remaining 14 links is 5. Therefore, an element in the $17^{th}$ column of the $8^{th}$ row is 5.

Alternatively, the $(N+1)^{th}$ column and the $(N+2)^{th}$ column in the foregoing link bandwidth matrix each may be stored in a form of a vector. This is not limited in this embodiment of this application.

When a link bandwidth matrix is the link bandwidth matrix in Implementation 2, a process in which the first forwarding device determines the first link for forwarding the first service flow may include: determining a fifth value $t_1$ based on M and a first hash value, where a value of $t_1$ is an integer greater than or equal to 1 and less than or equal to M, or a value range of $t_1$ is an integer interval determined by 1 to M; determining a sixth value $t_2$ based on a $t_1^{th}$ element from a 1" row to an $M^{th}$ row of the $(N+2)^{th}$ column and the first hash value; and determining the first link based on $t_1$, $t_2$, the link bandwidth matrix, and the link statuses respectively corresponding to the N links.

It can be learned from the foregoing content that the first forwarding device may obtain the first hash value by performing a hashing operation on the identification information of the first service flow. The first forwarding device may perform a modulo operation on the first hash value and M, and then add 1 to a value obtained through the modulo operation to obtain $t_1$. Then, the first forwarding device may perform a modulo operation on the first hash value and the $t_1^{th}$ element from the $1^{st}$ row to the $M^{th}$ row of the $(N+2)^{th}$ column, and then add 1 to a value obtained through the modulo operation to obtain $t_2$.

Table 2 is used as an example. Assuming that M=7, and the first hash value is 23, $t_1$=3. After a modulo operation is performed on the first hash value and a third element in the $18^{th}$ column, that is, a modulo operation is performed on 23 and 10, to obtain 3. Therefore, it can be learned that $t_2$=4.

After determining $t_1$ and $t_2$, the first forwarding device may search, a $t_1^{th}$ row of the N columns according to a preset direction, for a column in which a $t_2^{th}$ first element is located. If a link status corresponding to the column in which the $t_2^{th}$ first element is located is normal, a link corresponding to the column in which the $t_2^{th}$ first element is located may be determined as the first link. If a link status corresponding to the column in which the $t_2^{th}$ first element is located is faulty, a seventh value $t_3$ is determined based on the first hash value and P, where P is a quantity of types of link bandwidths corresponding to the remaining N–Y links excluding the Y links whose link statuses are faulty. Then, the first forwarding device determines, an eighth value $t_4$ based on a $t_3^{th}$ element from a $1^{st}$ row to a $M^{th}$ row of the $(N+1)^{th}$ column and the first hash value, searches a $t_3^{th}$ row of the N–Y columns for a column in which a $t_4^{th}$ first element is located, and determines a link corresponding to the column in which the $t_4^{th}$ first element is located as the first link. The preset direction may start from the $1^{st}$ column to an $N^{th}$ column, or may start from an $N^{th}$ column to the $1^{st}$ column.

Table 2, and $t_1$=3 and $t_2$=4 are used as an example. The first forwarding device may search, according to the preset direction, the $3^{rd}$ row of 16 columns corresponding to the 16 links for the column in which a $4^{th}$ first element is located. The preset direction may start from the $1^{st}$ column to the $16^{th}$ column, or may start from the $16^{th}$ column to the $1^{st}$ column. The preset direction from the $16^{th}$ column to the $1^{st}$ column is used as an example, and the column in which the $4^{th}$ first element in the $3^{rd}$ row of the 16 columns is located is the $13^{th}$ column. Because a link status of a $13^{th}$ link corresponding to the $13^{th}$ column is normal, the $13^{th}$ link may be directly used as the first link for forwarding the first service flow.

If the preset direction is from the $1^{st}$ column to the $16^{th}$ column, the column in which the $4^{th}$ first element in the $3^{rd}$ row of the 16 columns is located is the $5^{th}$ column. Because a link status of the $5^{th}$ link corresponding to the $5^{th}$ column is faulty, the $5^{th}$ link cannot be used as a link for forwarding the first service flow. In this case, the first forwarding device may perform a modulo operation on the first hash value and P, and add 1 to a value obtained through the modulo operation to obtain $t_3$. In this example, P=5, and therefore, $t_3$=4. Then, the first forwarding device may perform a modulo operation on the first hash value and the $t_3^{th}$ element from the $1^{st}$ row to the $M^{th}$ row of the $(N+1)^{th}$ column, and add 1 to a value obtained through the modulo operation to obtain $t_4$. In this example, a $4^{th}$ element in the $17^{th}$ column is 3. Therefore, $t_{4=3}$. Then, the first forwarding device may search a $4^{th}$ row in the 14 columns corresponding to the remaining 14 links excluding the two faulty links for a column in which a $3^{rd}$ first element is located. Similarly, searching may be performed from the $1^{st}$ column to the $16^{th}$ column. In this case, the $16^{th}$ column is the column in which the $3^{rd}$ first element is located in the $4^{th}$ row in the 14 columns. Therefore, the $16^{th}$ link corresponding to the $16^{th}$ column may be used as the first link for forwarding the first service flow. Alternatively, searching may be performed from the $16^{th}$ column to the $1^{st}$ column. In this case, a $3^{rd}$ column is the column in which the $3^{rd}$ first element is located in the $4^{th}$ row in the 14 columns. Therefore, the $3^{rd}$ link corresponding to the $3^{rd}$ column may be used as the first link for forwarding the first service flow.

After the first link for forwarding the first service flow is determined, step 603 may be performed if the first service flow is a unicast service flow, as shown in FIG. 6. Certainly, if the first service flow is a multicast service flow, the first forwarding device may perform step 604 or 605 as shown in FIG. 7.

At step 603: the first forwarding device forwards the first service flow through the first link.

In a unicast service scenario, the first forwarding device may include N links, and the N links may be used as a load balancing group for load balancing. In this scenario, after determining the first link by performing the foregoing steps 601 and 602, the first forwarding device may directly forward the first service flow through a port corresponding to the first link.

At step 604: if the first link is a link corresponding to the first forwarding device, the first forwarding device forwards the first service flow through the first link.

In a multicast service scenario, a plurality of forwarding devices may be used as a load balancing group. In this case, the N links may be links on the plurality of forwarding devices. In this scenario, after a multicast service flow is received, a load balancing group corresponding to the multicast service flow is determined from a forwarding table according to a multicast source address and a destination address of the multicast service flow. The first forwarding device in the load balancing group determines the first link by performing the foregoing steps 601 and 602; and then may determine, based on a link identifier of the first link, whether the first link is a link on the first forwarding device. If the first link is a link on the first forwarding device, the first forwarding device may forward the first service flow through the first link.

Similarly, another forwarding device besides the first forwarding device in the plurality of forwarding devices also performs the foregoing steps 601 and 602, determines whether a determined first link is a link corresponding to the another forwarding device. If yes, the another forwarding device forwards the first service flow; otherwise, the another forwarding device performs step 605.

At step 605: if the first link is not a link corresponding to the first forwarding device, the first forwarding device does not forward the first service flow.

If it is determined, based on the link identifier of the first link, that the first link is not a link corresponding to the first forwarding device, the first service flow is not forwarded by the first forwarding device. Instead, the first service flow is forwarded through a link of another forwarding device. In this case, the first forwarding device does not forward the first service flow.

A process in which the first forwarding device in the foregoing embodiment determines the first link for forwarding the first service flow is applied to each service flow that passes through the first forwarding device. The first forwarding device may determine a link of each service flow using method in the foregoing embodiments, to implement load balancing for a plurality of service flows.

In this embodiment of this application, the first forwarding device may obtain the identification information of the first service flow; perform a hash operation on the identification information of the first service flow to obtain the first hash value; and determine, based on the first hash value, the link bandwidth matrix, and the link statuses respectively corresponding to the N links, the first link for forwarding the first service flow by performing a modulo operation and a division operation. It can be learned that in this embodiment of this application, a hash operation does not need to be performed based on a device identifier of each forwarding device, and a specific forwarding device that performs forwarding does not need to be determined by comparing a plurality of hash values. Therefore, an amount of calculation is small and efficiency is high.

It should be noted that, in the foregoing embodiments, load balancing in the unicast service scenario may be implemented by using step 601 to step 603, and load balancing in the multicast service scenario may be implemented by using step 601, step 602, step 604, and step 605. A link bandwidth matrix is obtained through link configurations regardless of service scenarios for loading balancing. Based on this, the following separately describes configuration methods for forwarding devices in two service scenarios.

1. Multicast Service Scenario

In a multicast service scenario, a plurality of forwarding devices each may obtain configuration information. A first forwarding device is used as an example. The first forwarding device may obtain configuration information of both the first forwarding device and another forwarding device that belongs to a same load balancing group as the first forwarding device. The configuration information may include information about the load balancing group and link bandwidths of a corresponding device. The information about the load balancing group may include identification information of the load balancing group, a link included in the load balancing group, and a quantity of links.

Optionally, the configuration information may further include a quantity of links in the load balancing group and other protocol information.

The configuration information of the first forwarding device may be statically configured on the first forwarding device, and the configuration information of another forwarding device may be sent by the another forwarding device to the first forwarding device. Alternatively, in another possible implementation, the configuration information of both the first forwarding device and another forwarding device may be statically configured on the first forwarding device.

The two forwarding devices shown in FIG. 1 are used as an example. Assuming that the first forwarding device is R1 and a second forwarding device is R2, configuration information on R1 and configuration information on R2 may be as follows:

```
#Configuration information on R1
Multicast forwarding-load-balance-ucmp grpxxx [number 2]
    192.168.1.11 (member 1)
    192.168.1.12 (member 2)
Interface gi1/0/1
    Ip addr 192.168.1.11
    Pim sm
    Pim force-dr
    forwarding-load-balance-ucmp grpxxx
#Configuration information on R2
Multicast forwarding-load-balance-ucmp grpxxx [number 2]
    192.168.1.11 (member 1)
    192.168.1.12 (member 2)
Interface 10gi1/0/1
    Ip addr 192.168.1.12
    Pim sm
    Pim force-dr
    forwarding-load-balance-ucmp grpxxx
```

Multicast forwarding-load-balance-ucmp grpxxx [number 2] indicates a load balancing group named grpxxx. Load balancing is performed between R1 and R2, where R1 is identified by 192.168.1.11 and R2 is identified by 192.168.1.12. [number 2] is an optional configuration, which can be automatically generated based on configurations thereof, and indicates that a quantity of links in the load balancing group is 2. Interface gi1/0/1 indicates that an interface bandwidth is 1 Gbit/s. Interface 10gi1/0/1 indicates that an interface bandwidth is 10 Gbit/s. Ip addr 192.168.1.11 and Ip addr 192.168.1.12 indicate interface addresses, where Ip addr indicates an Internet protocol address. pim sm indicates that the PIM protocol is enabled on an interface. After the Pim sm command is run, a PIM Hello packet may be sent to and a PIM Hello packet may be received from the interface. Pim force-dr indicates that the interface is in a designated router (DR) state. After receiving a message for a downstream device for joining a multicast group, a multicast downstream status is generated, and a multicast group join message is sent to an upstream multicast source. forwarding-load-balance-ucmp grpxxx indicates that the interface uses the load balancing group grpxxx for load balancing.

Based on the foregoing configurations, R1 and R2 set a PIM DR state of an interface to DR after receiving PIM Hello packets. After receiving an internet group management protocol (IGMP) multicast join message, R1 and R2 create downstream outbound interfaces of a multicast entry, and send the multicast join message to the upstream multicast source. R1 and R2 may generate a link bandwidth matrix based on the foregoing configuration information, so as to perform load balancing on a received multicast service flow by using the foregoing method.

In the foregoing example, information about each forwarding device and information about another forwarding device are statically configured on each forwarding device. In another implementation, only information about each forwarding device may be configured on the corresponding forwarding device, and information about another forwarding device may be sent by the another forwarding device to the forwarding device. If only information about each forwarding device is configured on the corresponding forwarding device, each forwarding device may send configuration information of the forwarding device to a device other than the forwarding device by using different packets according to different scenarios.

In a PIM scenario, a plurality of forwarding devices are connected to the multicast transmit end 103 by using the PIM protocol, each forwarding device may send configuration information of the forwarding device to another device by using a PIM Hello packet. If a plurality of forwarding devices are connected to the multicast transmit end 103 through the EVPN, each forwarding device may send configuration information of the forwarding device to another forwarding device by using a border gateway protocol (BGP) EVPN message.

2. Unicast Service Scenario

In the unicast service scenario, the two forwarding devices shown in FIG. 2 are used as an example. Assuming that a first forwarding device is R1 and a second forwarding device is R2, configuration information on R1 and configuration information on R2 may be as follows:

```
#Configuration information on R1
Interface eth-trunk 1 //Configure Eth-Trunk 1
  Ucmp enable this_method
  Ip address 192.168.10.101 //Configure an IP address for the Eth-Trunk interface;
Interface gi1/0/1
  Distribute-weight 10 //Bandwidth of a 1ˢᵗ link is 10
  Eth-trunk 1
Interface gi1/0/2
  Distribute-weight 10 //Bandwidth of a 2ⁿᵈ link is 10
  Eth-trunk 1
Interface gi1/0/3
  Distribute-weight 1 //Bandwidth of a 3ʳᵈ link is 1
  Eth-trunk 1
Configuration information on R2
Interface eth-trunk 1 //Configure Eth-Trunk 1
  Ucmp enable this_method
  Ip address 192.168.10.102 //Configure an IP address for the Eth-Trunk interface;
Interface gi1/0/1
  Distribute-weight 10 //Bandwidth of the 1ˢᵗ link is 10
  Eth-trunk 1
Interface gi1/0/2
  Distribute-weight 10 //Bandwidth of the 2ⁿᵈ link is 10
  Eth-trunk 1
Interface gi1/0/3
  Distribute-weight 1 //Bandwidth of the 3ʳᵈ link is 1
  Eth-trunk 1
``` ucmp enable this method indicates that method provided in embodiments of this application is used for load balancing. There are three member interfaces on Eth-Trunk 1 of R1. There are also three member interfaces on Eth-Trunk 1 of R2.

R1 and R2 may generate a link bandwidth matrix based on the foregoing configuration information, so as to perform load balancing on a received unicast service flow by using the foregoing method.

Figure 8:
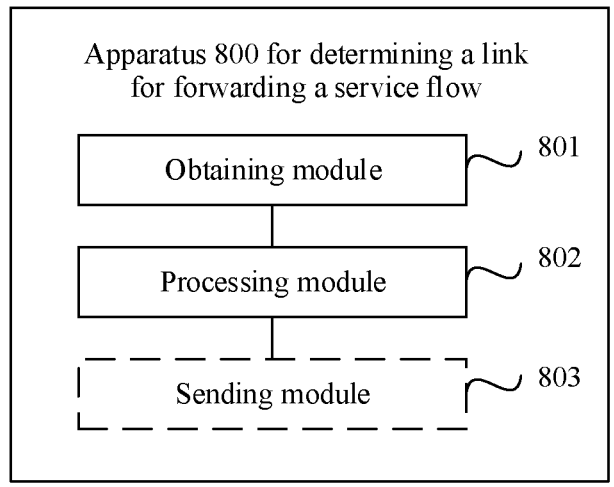
FIG. 8 is a schematic diagram of a structure of an apparatus for determining a link for forwarding a service flow according to an embodiment of this application.

As shown in FIG. 8, an embodiment of this application provides an apparatus 800 for determining a link for forwarding a service flow. The apparatus 800 may be integrated into the foregoing forwarding device. The apparatus 800 includes an obtaining module 801 and a processing module 802. The obtaining module 801 may be configured to perform step 601 in the foregoing embodiment, and the processing module 802 may be configured to perform step 602 and step 605 in the foregoing embodiment.

In an implementation, the obtaining module 801 is further configured to obtain identification information of a second service flow; and the processing module 802 is further configured to determine, based on the identification information of the second service flow, a link bandwidth matrix, and link statuses respectively corresponding to N links, a second link for forwarding the second service flow from the N links.

In an implementation, the processing module 802 is configured to: perform a hash operation on identification information of a first service flow to obtain a first hash value; and determine a first link from N links based on a link bandwidth matrix, the first hash value, and the link statuses respectively corresponding to the N links.

In an implementation, the link bandwidth matrix is an $M \times (N+3)$ matrix, M is not less than 1, an $i^{th}$ row in M rows corresponds to an $i^{th}$ type of link bandwidth, a value range of i is 1 to M, a $i^{th}$ column in N columns corresponds to a $j^{th}$ link, a quantity x of first elements included in the $j^{th}$ column is used to indicate that the $i^{th}$ link uses an $x^{th}$ type of link bandwidth, a value range of x is from 1 to M, an $(N+3)^{th}$ column represents a bandwidth difference, an $(N+2)^{th}$ column represents an accumulated configured bandwidth, and an $(N+1)^{th}$ column represents an accumulated actual bandwidth. An element in an $(i+1)^{th}$ row of the $(N+3)^{th}$ column is a difference between a link bandwidth corresponding to the $(i+1)^{th}$ row and a link bandwidth corresponding to an $i^{th}$ row, and an element in a $1^{st}$ row of the $(N+3)^{th}$ column is a value of a first type of link bandwidth. An element in an $(i+1)^{th}$ row of the $(N+2)^{th}$ column is a sum of an element in an $i^{th}$ row of the $(N+2)^{th}$ column and a product of the element in the $(i+1)^{th}$ row of the $(N+3)^{th}$ column and a quantity of first elements included in an $(i+1)^{th}$ row of the N columns, and an element in a $1^{st}$ row of the $(N+2)^{th}$ column is a quantity of first elements included in a $1^{st}$ row of the N columns. An element in an $(i+1)^{th}$ row of the $(N+1)^{th}$ column is a sum of an element in an $i^{th}$ row of the $(N+1)^{th}$ column and a product of the element in the $(i+1)^{th}$ row of an $(N+3)^{th}$ column and a quantity of first elements included in an $(i+1)^{th}$ row of N−Y columns in the N columns, where Y is a quantity of links whose link statuses are faulty, and a value range of Y is from 0 to N−1; and the element in the $1^{st}$ row of the $(N+3)^{th}$ column is a quantity of first elements included in a $1^{st}$ row of the N−Y columns in the N columns.

In an implementation, the processing module 802 is configured to: determine a first value $k_1$ based on an element in an $M^{th}$ row of the $(N+2)^{th}$ column and the first hash value; determine, starting from an element in a first row of the $(N+2)^{th}$ column, a row number Z of an element whose value is greater than $k_1$; determine a second value $k_2$ based on $k_1$, an element in a $(Z-1)^{th}$ row of the $(N+2)^{th}$ column, and an element in a $Z^{th}$ row of the $(N+3)^{th}$ column; and determine the first link based on an element in a $Z^{th}$ row of the N columns, $k_2$, and the link statuses respectively corresponding to the N links.

In an implementation, the processing module 802 is configured to: search elements in the $Z^{th}$ row of the N columns for a column in which a $k_2^{th}$ first element is located; and if a link status corresponding to the column in which the $k_2^{th}$ first element is located is normal, determine a link corresponding to the column in which the $k_2^{th}$ first element is located as the first link.

In an implementation, the processing module 802 is further configured to: if a link status corresponding to the found column in which a $k_2^{th}$ first element is located is faulty, determine a third value $k_3$ based on the first hash value and an element in a $P^{th}$ row of the $(N+1)^{th}$ column, where P is a quantity of types of link bandwidths corresponding to remaining N-Y links excluding the Y links whose link statuses are faulty; determine, starting from an element in a $1^{st}$ row of the $(N+1)^{th}$ column, a row number Z' of an element whose value is greater than $k_3$; determine a fourth value $k_4$ based on $k_3$, an element in a $(Z'-1)^{th}$ row of the $(N+1)^{th}$ column, and an element in a $Z'^{th}$ row of the $(N+3)^{th}$ column; and search elements in a $Z'^{th}$ row of the N-Y columns for a column in which a $k_4^{th}$ first element is located, and determine a link corresponding to the column in which the $k_4^{th}$ first element is located as the first link.

In an implementation, the link bandwidth matrix is an M×(N+2) matrix, where M is not less than 1, an $i^{th}$ row in M rows corresponds to an $i^{th}$ type of link bandwidth, a value range of i is 1 to M, kith column in N columns corresponds to kith link, a quantity x of first elements included in the $i^{th}$ column is used to indicate that the $j^{th}$ link uses an $x^{th}$ type of link bandwidth, a value range of x is from 1 to M, an $(N+2)^{th}$ column represents a configured bandwidth, and an $(N+1)^{th}$ column represents an actual bandwidth. An element in an $i^{th}$ row of the $(N+2)^{th}$ column is a quantity of first elements included in an $i^{th}$ row of the N columns. An element in an $i^{th}$ row of the $(N+1)^{th}$ column is a quantity of first elements included in an $i^{th}$ row of N-Y columns in the N columns, where Y is a quantity of links whose link statuses are faulty, and a value range of Y is from 0 to N-1.

In an implementation, the processing module 802 is configured to: determine a fifth value $t_1$ based on M and the first hash value, where $t_1$ ranges from 1 to M; determine a sixth value $t_2$ based on a $t_1^{th}$ element from a $1^{st}$ row to an $M^{th}$ row of the $(N+2)^{th}$ column and the first hash value; and determine the first link based on $t_1$, $t_2$, the link bandwidth matrix, and the link statuses respectively corresponding to the N links.

In an implementation, the processing module 802 is configured to: search, according to a preset direction, a $t_1^{th}$ row of the N columns for a column in which a $t_2^{th}$ first element is located; and if a link status corresponding to the column in which the $t_2^{th}$ first element is located is normal, determine a link corresponding to the column in which the $t_2^{th}$ first element is located as the first link.

In an implementation, the processing module 802 is further configured to: if a link status corresponding to the column in which the $t_2^{th}$ first element is located is faulty, determine a seventh value $t_3$ based on the first hash value and P, where P is a quantity of types of link bandwidths corresponding to remaining N-Y links excluding the Y links whose link statuses are faulty; determine an eighth value $t_4$ based on a $t_3^{th}$ element from a $1^{st}$ row to a $M^{th}$ row of the $(N+1)^{th}$ column and the first hash value; search a tat' row of the N-Y columns for a column in which a $t_4^{th}$ first element is located; and determine a link corresponding to the column in which the $t_4^{th}$ first element is located as the first link.

In an implementation, the link bandwidth matrix further includes an $(M+1)^{th}$ row, and an element in a $j^{th}$ column of the $(M+1)^{th}$ row is used to indicate a link status of a $j^{th}$ link.

In an implementation, the first service flow is a multicast service flow, and the apparatus 800 further includes a sending module 803. The sending module 803 is configured to: if the first link is a link corresponding to a first forwarding device, forward the first service flow through the first link, and the processing module 802 is further configured to: if the first link is not a link corresponding to the first forwarding device, skip forwarding the first service flow.

In an implementation, the processing module 802 is further configured to:
  obtain configuration information of both the first forwarding device and another forwarding device, where the configuration information includes information about a load balancing group to which the first forwarding device and the another forwarding device belong, and link bandwidths of N links included in the load balancing group; and
  generate the link bandwidth matrix based on the configuration information.

In an implementation, the configuration information of the another forwarding device is sent by the another forwarding device to the first forwarding device.

In an implementation, the first service flow is a unicast service flow, and the apparatus 800 further includes a sending module 803. The sending module 803 is configured to forward the first service flow through the first link.

In an implementation, the processing module 802 is further configured to: obtain link identifiers and link bandwidths of the N links, and generate the link bandwidth matrix based on the link identifiers and the link bandwidths of the N links.

In conclusion, in embodiments of this application, the first forwarding device may obtain the identification information of the first service flow, perform a hash operation on the identification information of the first service flow to obtain the first hash value; and determine, based on the first hash value, the link bandwidth matrix, and the link statuses respectively corresponding to the N links, the first link for forwarding the first service flow by performing a modulo operation and a division operation. It can be learned that in embodiments of this application, a hash operation does not need to be performed based on a device identifier of each forwarding device, and a specific forwarding device that performs forwarding does not need to be determined by comparing a plurality of hash values. Therefore, an amount of calculation is small and efficiency is high.

It should be noted that division into the foregoing functional modules is merely used as an example to describe how the apparatus for determining a link for forwarding a service flow provided in the foregoing embodiments determine a link for forwarding a service flow. During actual application, the foregoing functions may be allocated to different functional modules for implementation as required, that is, an internal structure of a device is divided into different functional modules to implement all or some of the functions described above. In addition, the apparatus for determining a link for forwarding a service flow provided in the foregoing embodiments and the method embodiments for determining a link for forwarding a service flow belong to a same concept. For an exemplary implementation process thereof, refer to the method embodiments, and details are not described herein again.

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A method for determining a link for forwarding a service flow, applied to a first forwarding device comprising one or more processors configured to perform the method, wherein the method comprises:
    obtaining identification information of a first service flow; and
    determining, based on a link bandwidth matrix, the identification information of the first service flow, and link statuses respectively corresponding to N links, a first link for forwarding the first service flow from the N links, wherein the link bandwidth matrix indicates link bandwidths corresponding to the N links, and N is not less than 2, and wherein the link bandwidth matrix includes at least M rows and N columns, and the link bandwidth matrix further comprises an $(M+1)^{th}$ row, and an element in a $j^{th}$ column of the $(M+1)^{th}$ row indicates a link status corresponding to a $j^{th}$ link.

2. The method according to claim 1, wherein the method further comprises:
    obtaining identification information of a second service flow; and
    determining, based on the identification information of the second service flow, the link bandwidth matrix, and the link statuses respectively corresponding to the N links, a second link for forwarding the second service flow from the N links.

3. The method according to claim 1, wherein determining, based on the link bandwidth matrix, the identification information of the first service flow, and the link statuses respectively corresponding to the N links, the first link for forwarding the first service flow from the N links comprises:
    performing a hash operation on the identification information of the first service flow, to obtain a first hash value; and
    determining the first link from the N links based on the link bandwidth matrix, the first hash value, and the link statuses respectively corresponding to the N links.

4. The method according to claim 3, wherein the link bandwidth matrix is an M×(N+3) matrix, M is not less than 1, an $i^{th}$ row in the M rows corresponds to an $i^{th}$ type of link bandwidth, a value range of i is 1 to M, a $i^{th}$ column in the N columns corresponds to a $j^{th}$ link, a quantity x of first elements comprised in the $j^{th}$ column indicates that the $j^{th}$ link uses an $x^{th}$ type of link bandwidth, a value range of x is from 1 to M, an $(N+3)^{th}$ column represents a bandwidth difference, an $(N+2)^{th}$ column represents an accumulated configured bandwidth, and an $(N+1)^{th}$ column represents an accumulated actual bandwidth;
    an element in an $(i+1)^{th}$ row of the $(N+3)^{th}$ column is a difference between a link bandwidth corresponding to the $(i+1)^{th}$ row and a link bandwidth corresponding to an $i^{th}$ row, and an element in a $1^{st}$ row of the $(N+3)^{th}$ column is a value of a first type of link bandwidth;
    an element in an $(i+1)^{th}$ row of the $(N+2)^{th}$ column is a sum of an element in an $i^{th}$ row of the $(N+2)^{th}$ column and a product of the element in the $(i+1)^{th}$ row of the $(N+3)^{th}$ column and a quantity of first elements comprised in an $(i+1)^{th}$ row of the N columns, and an element in a $1^{st}$ row of the $(N+2)^{th}$ column is a quantity of first elements comprised in a $1^{st}$ row of the N columns; and
    an element in an $(i+1)^{th}$ row of the $(N+1)^{th}$ column is a sum of an element in an $i^{th}$ row of the $(N+1)^{th}$ column and a product of the element in the $(i+1)^{th}$ row of the $(N+3)^{th}$ column and a quantity of first elements comprised in an $(i+1)^{th}$ row of N-Y columns in the N columns, wherein Y is a quantity of links whose link statuses are faulty, and a value range of Y is from 0 to N-1; and the element in the $1^{st}$ row of the $(N+3)^{th}$ column is a quantity of first elements comprised in a $1^{st}$ row of the N-Y columns in the N columns.

5. The method according to claim 4, wherein determining the first link from the N links based on the link bandwidth matrix, the first hash value, and the link statuses respectively corresponding to the N links comprises:
    determining a first value $k_1$ based on an element in an $M^{th}$ row of the $(N+2)^{th}$ column and the first hash value;
    determining, starting from an element in a $1^{st}$ row of the $(N+2)^{th}$ column, a row number Z of an element whose value is greater than $k_1$;
    determining a second value $k_2$ based on $k_1$, an element in a $(Z-1)^{th}$ row of the $(N+2)^{th}$ column, and an element in a $Z^{th}$ row of the $(N+3)^{th}$ column; and determining the first link based on an element in a $Z^{th}$ row of the N columns, $k_2$, and the link statuses respectively corresponding to the N links.

6. The method according to claim 3, wherein the link bandwidth matrix is an M×(N+2) matrix, M is not less than 1, an $i^{th}$ row in the M rows corresponds to an $i^{th}$ type of link bandwidth, a value range of i is 1 to M, a $i^{th}$ column in the N columns corresponds to a $j^{th}$ link, a quantity x of first elements comprised in the $j^{th}$ column indicates that the $j^{th}$ link uses an $x^{th}$ type of link bandwidth, a value range of x is from 1 to M, an $(N+2)^{th}$ column represents a configured bandwidth, and an $(N+1)^{th}$ column represents an actual bandwidth;
   an element in an $i^{th}$ row of the $(N+2)^{th}$ column is a quantity of first elements comprised in an $i^{th}$ row of the N columns; and
   an element in an $i^{th}$ row of the $(N+1)^{th}$ column is a quantity of first elements comprised in an $i^{th}$ row of N−Y columns in the N columns, wherein Y is a quantity of links whose link statuses are faulty, and a value range of Y is from 0 to N−1.

7. The method according to claim 6, wherein determining the first link from the N links based on the link bandwidth matrix, the first hash value, and the link statuses respectively corresponding to the N links comprises:
   determining a fifth value $t_1$ based on M and the first hash value, wherein $t_1$ ranges from 1 to M;
   determining a sixth value $t_2$ based on a $t_1^{th}$ element from a $1^{st}$ row to an $M^{th}$ row of the $(N+2)^{th}$ column and the first hash value; and
   determining the first link based on $t_1$, $t_2$, the link bandwidth matrix, and the link statuses respectively corresponding to the N links.

8. The method according to claim 1, wherein the first service flow is a multicast service flow, and after determining, based on the link bandwidth matrix, the identification information of the first service flow, and the link statuses respectively corresponding to the N links, the first link for forwarding the first service flow from the N links, the method further comprises:
   after determining that the first link is a link corresponding to the first forwarding device, forwarding the first service flow through the first link.

9. The method according to claim 1, wherein the method further comprises:
   obtaining configuration information of both the first forwarding device and another forwarding device, wherein the configuration information comprises information about a load balancing group to which the first forwarding device and the other forwarding device belong, and link bandwidths of N links comprised in the load balancing group; and
   generating the link bandwidth matrix based on the configuration information.

10. An apparatus for determining a link for forwarding a service flow, deployed in a first forwarding device, wherein the apparatus comprises:
   a memory storing instructions; and
   a processor coupled to the memory to execute the instructions to:
   obtain identification information of a first service flow; and
   determine, based on a link bandwidth matrix, the identification information of the first service flow, and link statuses respectively corresponding to N links, a first link for forwarding the first service flow from the N links, wherein the link bandwidth matrix indicates link bandwidths corresponding to the N links, and N is not less than 2, and wherein the link bandwidth matrix includes at least M rows and N columns, and the link bandwidth matrix further comprises an $(M+1)^{th}$ row, and an element in a $j^{th}$ column of the $(M+1)^{th}$ row indicates a link status corresponding to a $j^{th}$ link.

11. The apparatus according to claim 10, wherein the processor further executes the instructions to:
   obtain identification information of a second service flow; and
   determine, based on the identification information of the second service flow, the link bandwidth matrix, and the link statuses respectively corresponding to the N links, a second link for forwarding the second service flow from the N links.

12. The apparatus according to claim 10, wherein the processor executes the instructions to:
   perform a hash operation on the identification information of the first service flow, to obtain a first hash value; and
   determine the first link from the N links based on the link bandwidth matrix, the first hash value, and the link statuses respectively corresponding to the N links.

13. The apparatus according to claim 12, wherein the link bandwidth matrix is an M×(N+3) matrix, M is not less than 1, an $i^{th}$ row in the M rows corresponds to an $i^{th}$ type of link bandwidth, a value range of i is 1 to M, a $i^{th}$ column in the N columns corresponds to a $j^{th}$ link, a quantity x of first elements comprised in the $j^{th}$ column indicates that the $j^{th}$ link uses an $x^{th}$ type of link bandwidth, a value range of x is from 1 to M, an $(N+3)^{th}$ column represents a bandwidth difference, an $(N+2)^{th}$ column represents an accumulated configured bandwidth, and an $(N+1)^{th}$ column represents an accumulated actual bandwidth;
   an element in an $(i+1)^{th}$ row of the $(N+3)^{th}$ column is a difference between a link bandwidth corresponding to the $(i+1)^{th}$ row and a link bandwidth corresponding to an $i^{th}$ row, and an element in a $1^{st}$ row of the $(N+3)^{th}$ column is a value of a first type of link bandwidth;
   an element in an $(i+1)^{th}$ row of the $(N+2)^{th}$ column is a sum of an element in an $i^{th}$ row of the $(N+2)^{th}$ column and a product of the element in the $(i+1)^{th}$ row of the $(N+3)^{th}$ column and a quantity of first elements comprised in an $(i+1)^{th}$ row of the N columns, and an element in a $1^{st}$ row of the $(N+2)^{th}$ column is a quantity of first elements comprised in a $1^{st}$ row of the N columns; and
   an element in an $(i+1)^{th}$ row of the $(N+1)^{th}$ column is a sum of an element in an $i^{th}$ row of the $(N+1)^{th}$ column and a product of the element in the $(i+1)^{th}$ row of the $(N+3)^{th}$ column and a quantity of first elements comprised in an $(i+1)^{th}$ row of N−Y columns in the N columns, wherein Y is a quantity of links whose link statuses are faulty, and a value range of Y is from 0 to N−1; and the element in the $1^{st}$ row of the $(N+3)^{th}$ column is a quantity of first elements comprised in a $1^{st}$ row of the N−Y columns in the N columns.

14. The apparatus according to claim 12, wherein the link bandwidth matrix is an M×(N+2) matrix, M is not less than 1, an $i^{th}$ row in the M rows corresponds to an $i^{th}$ type of link bandwidth, a value range of i is 1 to M, a $i^{th}$ column in the N columns corresponds to a $j^{th}$ link, a quantity x of first elements comprised in the $j^{th}$ column indicates that the $j^{th}$ link uses an $x^{th}$ type of link bandwidth, a value range of x is from 1 to M, an $(N+2)^{th}$ column represents a configured bandwidth, and an $(N+1)^{th}$ column represents an actual bandwidth;

an element in an $i^{th}$ row of the $(N+2)^{th}$ column is a quantity of first elements comprised in an $i^{th}$ row of the N columns; and an element in an $i^{th}$ row of the $(N+1)^{th}$ column is a quantity of first elements comprised in an $i^{th}$ row of N−Y columns in the N columns, wherein Y is a quantity of links whose link statuses are faulty, and a value range of Y is from 0 to N−1.

15. The apparatus according to claim 14, wherein the processor executes the instructions to:

determine a fifth value $t_1$ based on M and the first hash value, wherein $t_1$ ranges from 1 to M;

determine a sixth value $t_2$ based on a $t_1^{th}$ element from a $1^{st}$ row to an $M^{th}$ row of the $(N+2)^{th}$ column and the first hash value; and determine the first link based on $t_1$, $t_2$, the link bandwidth matrix, and the link statuses respectively corresponding to the N links.

16. The apparatus according to claim 10, wherein the first service flow is a multicast service flow, and the processor further executes the instructions to:

in response to the first link being a link corresponding to the first forwarding device, forward the first service flow through the first link;

in response to the first link being not a link corresponding to the first forwarding device, skip forwarding the first service flow.

\* \* \* \* \*

UNITED STATES PATENT AND TRADEMARK OFFICE
CERTIFICATE OF CORRECTION

PATENT NO. : 11,876,680 B2
APPLICATION NO. : 17/882343
DATED : January 16, 2024
INVENTOR(S) : Xie et al.

Page 1 of 1

It is certified that error appears in the above-identified patent and that said Letters Patent is hereby corrected as shown below:

In the Claims

Claim 4: Column 28, Line 25: "bandwidth, a value range of i is 1 to M, a $i^{th}$ column in the" should read -- bandwidth, a value range of i is 1 to M, a $j^{th}$ column in the --.

Claim 6: Column 29, Line 7: "bandwidth, a value range of i is 1 to M, a $i^{th}$ column in the" should read -- bandwidth, a value range of i is 1 to M, a $j^{th}$ column in the --.

Claim 13: Column 30, Line 27: "bandwidth, a value range of i is 1 to M, a $i^{th}$ column in the" should read -- bandwidth, a value range of i is 1 to M, a $j^{th}$ column in the --.

Claim 14: Column 30, Line 61: "bandwidth, a value range of i is 1 to M, a $i^{th}$ column in the" should read -- bandwidth, a value range of i is 1 to M, a $j^{th}$ column in the --.

Signed and Sealed this
Thirtieth Day of April, 2024

Katherine Kelly Vidal
*Director of the United States Patent and Trademark Office*